United States Patent
Kusaka

(10) Patent No.: US 8,780,184 B2
(45) Date of Patent: Jul. 15, 2014

(54) IMAGE PICKUP APPARATUS

(75) Inventor: Hiroya Kusaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 13/234,354

(22) Filed: Sep. 16, 2011

(65) Prior Publication Data
US 2012/0069152 A1  Mar. 22, 2012

(30) Foreign Application Priority Data

Sep. 21, 2010 (JP) ................................. 2010-210387
Sep. 12, 2011 (JP) ................................. 2011-197918

(51) Int. Cl.
*H04N 13/02* (2006.01)
(52) U.S. Cl.
USPC .......................................................... 348/47
(58) Field of Classification Search
None
See application file for complete search history.

(56) References Cited

U.S. PATENT DOCUMENTS

| 5,973,733 A * | 10/1999 | Gove ....................... 348/208.13 |
| 6,996,297 B2 * | 2/2006 | Krause et al. ................... 385/11 |
| 7,489,341 B2 * | 2/2009 | Yang et al. ............... 348/208.99 |
| 8,269,822 B2 * | 9/2012 | Zalewski ......................... 348/56 |
| 2008/0049108 A1 * | 2/2008 | Ebato .......................... 348/208.2 |
| 2008/0204565 A1 * | 8/2008 | Yumiki .................... 348/208.99 |
| 2009/0142041 A1 * | 6/2009 | Nagasawa et al. ............. 386/124 |
| 2010/0039504 A1 * | 2/2010 | Takahashi et al. .............. 348/54 |
| 2011/0007133 A1 * | 1/2011 | Imanishi .......................... 348/42 |
| 2012/0019532 A1 * | 1/2012 | Yanagita et al. .............. 345/419 |

FOREIGN PATENT DOCUMENTS

| JP | 2008-187385 A | 8/2008 |
| JP | 2010-045584 A | 2/2010 |

* cited by examiner

*Primary Examiner* — Sath V Perungavoor
*Assistant Examiner* — Janese Duley
(74) *Attorney, Agent, or Firm* — Renner, Otto, Boisselle & Sklar, LLP

(57) ABSTRACT

An image pickup apparatus capable of taking a 3D picture may produce a 3D picture that gives a viewer a sense of strangeness if panning, tilting, or considerable camera shake occurs during imaging. Provided is an image pickup apparatus including: a motion detecting section, which detects the motion of the image pickup apparatus; and a picture data outputting section, which switches its output between 2D picture data and 3D picture data obtained by picking up subject images, depending on the detected motion of the image pickup apparatus. An appropriate picture is provided by switching the output between 2D picture data and 3D picture data depending on the motion of the image pickup apparatus. An appropriate picture is provided also by changing the stereo base of optical systems, or adjusting a parallax between the left image and the right image, in accordance with the motion of the image pickup apparatus.

23 Claims, 18 Drawing Sheets

IMAGE PICKUP APPARATUS

BACKGROUND OF THE INVENTION

1. Field of the Invention

The present invention relates to an image pickup apparatus, and more particularly, to an image pickup apparatus having a function of taking a two-dimensional (2D) video and a three-dimensional (3D) video.

2. Description of the Related Art

Some television and movie contents of recent years are provided in a 3D format, and an environment that allows general users easy viewing of 3D pictures is on the way. In conjunction with this, image pickup apparatus manufacturers have proposed cameras capable of taking a 3D picture.

The common conventional method of taking a 3D picture is to photograph the same subject from different view points at the same time and obtain and generate a 3D picture from the amount of parallax between the view points. However, because a 3D picture is seen through a process in which the human brain recognizes a picture formed from parallax images as a three-dimensional image, images seen with eyes that are not adjusted properly for the process in which the human perceives a three-dimensional image may give the viewer a sense of strangeness. It has therefore been proposed as in Japanese Patent Application Laid-open No. 2008-187385 that, to take a 3D picture with an image pickup apparatus capable of handling 3D pictures, the camera control method (the cycle of exposure control in the case of Japanese Patent Application Laid-open No. 2008-187385) is changed from that of 2D imaging in a manner that prevents the viewer viewing the 3D picture from feeling a sense of strangeness.

However, there are various other conditions that give a viewer of a 3D picture a sense of strangeness. Consumer cameras, in particular, which are used to take a 3D picture by general camera users instead of professionals, should have an automatic camera control function for adjusting the camera settings in advance to suit imaging conditions and a function of processing 3D picture data that is to be recorded so that a 3D picture taken may be an appropriate picture that does not give the viewer a sense of strangeness during viewing.

SUMMARY OF THE INVENTION

The present invention has been made in view of those problems, and an object of the present invention is therefore to provide an image pickup apparatus capable of producing an appropriate picture by automatic camera control or by picture data processing under imaging conditions where a 3D picture taken may give a viewer a sense of strangeness.

An image pickup apparatus according to the present invention includes: a motion detecting section which detects a motion of the image pickup apparatus; and a picture data outputting section which switches its output between 2D picture data and 3D picture data obtained by picking up subject images, depending on the detected motion of the image pickup apparatus.

According to one embodiment of the present invention, the image pickup apparatus further includes a determining section which determines whether or not the image pickup apparatus is performing at least one of panning imaging and tilting imaging based on the detected motion of the image pickup apparatus, and, when it is determined that the image pickup apparatus is performing the at least one of the panning imaging and the tilting imaging while the picture data outputting section is outputting the 3D picture data, the picture data outputting section switches its output from the 3D picture data to the 2D picture data.

According to one embodiment of the present invention, when it is determined that the image pickup apparatus has shifted from performing the at least one of the panning imaging and the tilting imaging to performing none of the panning imaging and the tilting imaging, the picture data outputting section switches its output from the 2D picture data to the 3D picture data.

According to one embodiment of the present invention, the image pickup apparatus further includes a determining section which determines a state of shaking of the image pickup apparatus due to camera shake based on the detected motion of the image pickup apparatus, and, when it is determined that the shaking of the image pickup apparatus is equal to or larger than a given level while the picture data outputting section is outputting the 3D picture data, the picture data outputting section switches its output from the 3D picture data to the 2D picture data.

According to one embodiment of the present invention, when it is determined that the shaking of the image pickup apparatus has shifted from the given level or more to less than the given level, the picture data outputting section switches its output from the 2D picture data to the 3D picture data.

According to one embodiment of the present invention, the motion detecting section is an angular velocity sensor.

According to one embodiment of the present invention, the motion detecting section detects a motion vector from an image taken.

An image pickup apparatus according to the present invention includes: a motion detecting section which detects a motion of the image pickup apparatus; a first optical system and a second optical system which are disposed side by side and each form a subject image; a picture data generating section which generates 3D picture data based on image signals that are obtained by picking up two subject images formed by the first optical system and the second optical system; and a changing section which moves at least one of the first optical system and the second optical system in a direction perpendicular to an optical axis in accordance with the detected motion of the image pickup apparatus, to thereby change a stereo base which is a distance between optical axes of the first optical system and the second optical system.

According to one embodiment of the present invention, the image pickup apparatus further includes a determining section which determines whether or not the image pickup apparatus is performing at least one of panning imaging and tilting imaging based on the detected motion of the image pickup apparatus, and, when it is determined that the image pickup apparatus is performing at least one of the panning imaging and the tilting imaging, the changing section shortens the stereo base.

According to one embodiment of the present invention, when it is determined that the image pickup apparatus has shifted from performing the at least one of the panning imaging and the tilting imaging to performing none of the panning imaging and the tilting imaging, the changing section lengthens the stereo base.

According to one embodiment of the present invention, the image pickup apparatus further includes a determining section which determines a state of shaking of the image pickup apparatus due to camera shake based on the detected motion of the image pickup apparatus, and, when it is determined that the shaking of the image pickup apparatus is equal to or larger than a given level, the changing section shortens the stereo base.

According to one embodiment of the present invention, when it is determined that the shaking of the image pickup apparatus has shifted from the given level or more to less than the given level, the changing section lengthens the stereo base.

According to one embodiment of the present invention, the motion detecting section is an angular velocity sensor.

According to one embodiment of the present invention, the motion detecting section detects a motion vector from an image taken.

An image pickup apparatus according to the present invention includes: a motion detecting section which detects a motion of the image pickup apparatus; a parallax adjusting section which adjusts a parallax between an image for a right eye and an image for a left eye obtained by picking up subject images in accordance with the detected motion of the image pickup apparatus; and a picture data generating section which generates 3D picture data based on the adjusted parallax.

According to one embodiment of the present invention, the image pickup apparatus further includes a determining section which determines whether or not the image pickup apparatus is performing at least one of panning imaging and tilting imaging based on the detected motion of the image pickup apparatus, and, when it is determined that the image pickup apparatus is performing the at least one of the panning imaging and the tilting imaging, the parallax adjusting section reduces the parallax.

According to one embodiment of the present invention, when it is determined that the image pickup apparatus has shifted from performing the at least one of the panning imaging and the tilting imaging to performing none of the panning imaging and the tilting imaging, the parallax adjusting section increases the parallax.

According to one embodiment of the present invention, the image pickup apparatus further includes a determining section which determines a state of shaking of the image pickup apparatus due to camera shake based on the detected motion of the image pickup apparatus, and, when it is determined that the shaking of the image pickup apparatus is equal to or larger than a given level, the parallax adjusting section reduces the parallax.

According to one embodiment of the present invention, when it is determined that the shaking of the image pickup apparatus has shifted from the given level or more to less than the given level, the parallax adjusting section increases the parallax.

According to one embodiment of the present invention, the motion detecting section is an angular velocity sensor.

According to one embodiment of the present invention, the motion detecting section detects a motion vector from an image taken.

A program according to the present invention causes an image pickup apparatus to execute picture processing, and further causes the image pickup apparatus to execute the step of switching its output between 2D picture data and 3D picture data obtained by picking up subject images, depending on a motion of the image pickup apparatus.

A program according to the present invention causes an image pickup apparatus to execute picture processing, and further causes the image pickup apparatus to execute the steps of: adjusting a parallax between an image for a right eye and an image for a left eye obtained by picking up subject images in accordance with a motion of the image pickup apparatus; and generating 3D picture data based on the adjusted parallax.

According to the present invention, an appropriate picture can be produced by the automatic camera control or by the picture data processing under imaging conditions where a 3D picture taken may give a viewer a sense of strangeness.

According to one embodiment of the present invention, the switching is made between outputting 2D picture data and outputting 3D picture data depending on the motion of the image pickup apparatus, thereby producing an appropriate picture.

According to one embodiment of the present invention, the stereo base, which is the distance between the optical axis of the first optical system and the optical axis of the second optical system, is changed depending on the motion of the image pickup apparatus, thereby producing an appropriate picture.

According to one embodiment of the present invention, the parallax between the image for the right eye and the image for the left eye is adjusted depending on the motion of the image pickup apparatus, thereby producing an appropriate picture.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Image pickup apparatus according to embodiments of the present invention are described below with reference to the drawings.

First Embodiment

Figure 1:
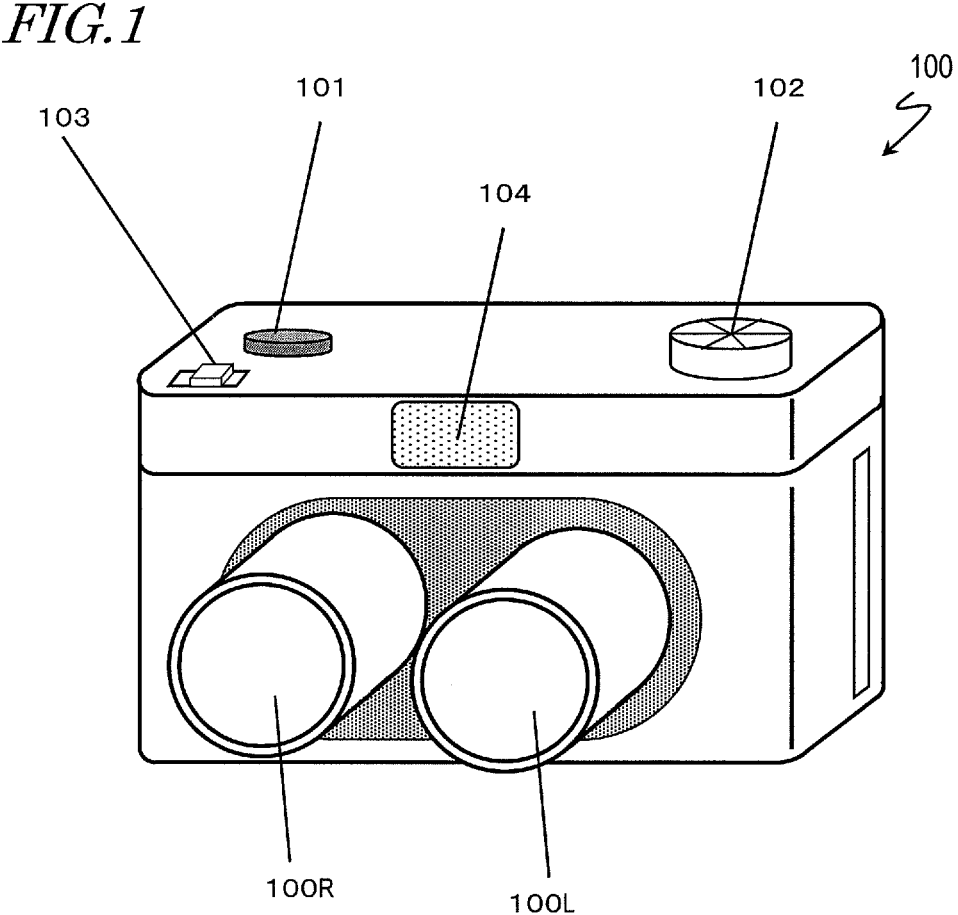
FIG. 1 is a diagram illustrating the exterior of an image pickup apparatus according to a first embodiment of the present invention.

FIG. 1 is a diagram illustrating the exterior of an image pickup apparatus 100 according to a first embodiment of the present invention. The image pickup apparatus 100 of FIG. 1 includes two imaging lenses, which are respectively denoted by 100R (the lens on the right side as a person holding the image pickup apparatus 100 faces a subject) and 100L (the one on the left side as a person holding the image pickup apparatus 100 faces a subject), a video recording ON/OFF switch 101, a mode switching switch 102, a zoom lever 103, and a strobe 104.

The image pickup apparatus 100 takes a 3D picture based on two lateral (left-right) parallax images which are obtained via the two imaging lenses 100R and 100L. This image pickup apparatus 100 is also capable of taking a 2D picture using an image that is taken with only one of the two imaging lenses.

The mode switching switch 102 is used to switch between imaging modes such as a 2D imaging mode and a 3D imaging mode or a video imaging mode and a still image imaging mode. The zoom lever 103 is used to instruct a change in the focal distance of the two imaging lenses 100R and 100L. The strobe 104 is used for the imaging of a subject in the dark. When the video recording ON/OFF switch 101 is pressed once in the video imaging mode, video recording is started and stopped at the time the video recording ON/OFF switch 101 is pressed again.

Figure 2:
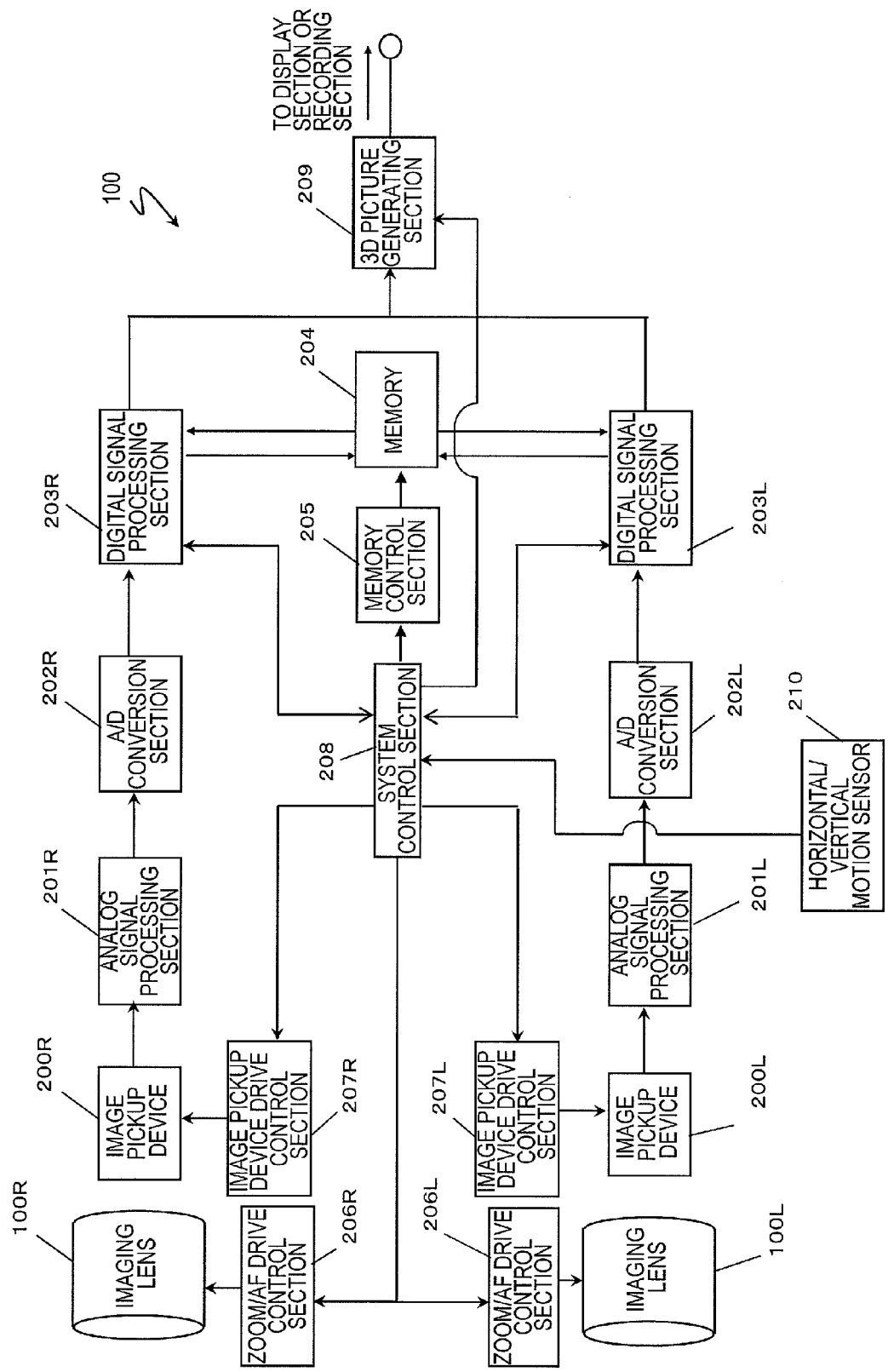
FIG. 2 is a diagram illustrating the internal structure of the image pickup apparatus according to the first embodiment of the present invention.

FIG. 2 is a block diagram illustrating the internal structure of the image pickup apparatus 100 of FIG. 1. In FIG. 2, components whose reference symbols end with R are components for obtaining image data from a subject image that is obtained via the imaging lens 100R, and components whose reference symbols end with L are components for obtaining image data from a subject image that is obtained via the imaging lens 100L. The components denoted by reference symbols with R and the components denoted by reference symbols with L are basically the same in function and operation, and the repetition of the same description is therefore omitted. The description given here is mainly about the functions and operation of the components denoted by reference symbols with R.

In FIG. 2, the imaging lens 100R is an optical system including a plurality of lens units for imaging a subject image on an image pickup device 200R, and has a zooming function and a focusing function.

The image pickup device 200R is a photoelectric conversion device that converts an imaged subject image into electrical signals (image signals), for example, a CCD image sensor or a CMOS image sensor.

An analog signal processing section 201R processes the image signals obtained from the image pickup device 200R through gain adjustment, noise removal, and the like. The processed image signals are converted into digital signals by an A/D conversion section 202R.

The image signals converted into digital signals by the A/D conversion section 202R are sent to a digital signal processing section 203R.

The digital signal processing section 203R executes various kinds of necessary digital processing such as the separation of luminance signals and color difference signals, noise removal, gamma correction, sharpness improving processing, and electronic zooming processing. The digital signal processing section 203R also detects contrast variations in image signals of a taken image, extracts information necessary for the focusing control (auto focus) of the imaging lens 100R, and supplies the information to a system control section 208, which is described later.

A memory 204 stores image data (image signals) that have passed through the digital signal processing section 203R. Image data stored in the memory 204 is not limited to signals that have been processed by the digital signal processing section 203R. The memory 204 may also be used as a buffer memory by temporarily storing image data that is supplied from the A/D conversion section 202R in the memory 204 without any processing, reading only necessary image data out of the memory 204 on, for example, a block basis to process the read data in the digital signal processing section 203R, and then writing the processed data back again to the memory 204.

A memory control section 205 controls the recording of image data to the memory 204 and the reading of image data out of the memory 204 following an instruction from the system control section 208.

A zoom/AF drive control section 206R drives a zoom motor (not shown) and a focus motor (not shown) to control the zoom magnification and focusing of the imaging lens 100R, and adjusts the zoom magnification and focusing position (focus) of the imaging lens 100R as instructed by an instruction signal from the system control section 208.

An image pickup device drive control section 207R controls the driving of the image pickup device 200R as instructed by an instruction signal from the system control section 208 by supplying pulse signals for controlling the exposure timing and signal reading timing of the image pickup device 200R and for controlling electronic shutter operation.

The imaging lens 100L, an image pickup device 200L, an analog signal processing section 201L, an A/D conversion section 202L, a digital signal processing section 203L, a zoom/AF drive control section 206L, and an image pickup device drive control section 207L are the same in function and operation as the components described above which are denoted by reference symbols with R. Descriptions thereof are therefore omitted.

The system control section 208 controls the overall operation of the image pickup apparatus 100. Based on information supplied from the digital signal processing sections 203R and 203L and a horizontal/vertical motion sensor 210, the state of the mode switching switch 102 and the zoom lever 103, and the like, the system control section 208 controls the zoom/AF drive control sections 206R and 206L, the image pickup device drive control sections 207R and 207L, the digital signal processing sections 203R and 203L, the memory control section 205, a 3D picture generating section 209, and other components in an integrated manner, and gives an instruction that makes the components operate appropriately in conjunction with one another when taking a picture. The system control section 208 is constituted by, for example, a microcomputer and a control program stored therein.

The 3D picture generating section 209 generates a 3D picture from two types of image signals obtained from the two imaging lenses and the components of the two systems which process subject images taken with the imaging lenses.

The horizontal/vertical motion sensor 210 functions as a motion detecting section which detects the motion of the image pickup apparatus 100 itself. The horizontal/vertical motion sensor 210 is a physical sensor such as a gyro sensor (angular velocity sensor) and is built in the image pickup apparatus 100 to output angular velocity data that corresponds to the motion of the image pickup apparatus 100 itself and to supply the data to the system control section 208. The 3D picture generating section 209 also functions as a picture data outputting section which switches its output between 2D picture data and 3D picture data obtained by picking up a subject image, depending on the detected motion of the image pickup apparatus 100.

The operation of the thus structured image pickup apparatus 100 of the first embodiment is described in detail below.

Here, the mode switching switch 102 of the image pickup apparatus 100 is set to a 3D video imaging mode in advance. In this case, when an operator of the image pickup apparatus 100 presses the video recording ON/OFF switch 101 to start video recording, the system control section 208 sets the imaging lenses 100R and 100L to the same zoom magnification and correctly focuses the two lenses as well, and then drives the two image pickup devices 200R and 200L at the same timing to start imaging. Image signals of images taken in a given frame cycle are output from the two image pickup devices and supplied via the analog signal processing sections 201R and 201L, the A/D conversion sections 202R and 202L, and the digital signal processing sections 203R and 203L to the 3D picture generating section 209, where 3D picture data is generated. The 3D picture data is generated by a method that uses a known technology. In this embodiment, for example, a time division method which records pictures for the left eye and pictures for the right eye from parallax videos obtained from two systems is used to generate 3D picture data, and the generated data is recorded in a recording medium (not shown) (hard disk or semiconductor memory card) of the image pickup apparatus. The generated 3D picture data may instead be recorded in the memory 204 or may be output to an external machine without being recorded in the image pickup apparatus 100.

When the video recording is started, the horizontal/vertical motion sensor 210 detects the motion of the image pickup apparatus 100 and supplies the detected motion to the system control section 208.

In video imaging with the image pickup apparatus 100, the person taking the image intentionally changes picture composition frequently. As is well known, quick changes in picture composition in particular are called panning (changes in picture composition in the horizontal direction) and tilting (changes in picture composition in the vertical direction). When a panning or tilting operation is made during imaging, a viewer often has difficulties in following the changes in picture composition (subject image) and feels a sense of strangeness, which occurs even in 2D imaging and is more serious in the case of a 3D picture.

The first embodiment lessens this sense of strangeness felt by a viewer by determining the motion (imaging conditions) of the image pickup apparatus 100 from the output of the horizontal/vertical motion sensor 210 and switching the pictures to be video-recorded from 3D pictures to 2D pictures when the panning or tilting operation described above is detected from the determined motion.

The system control section 208 functions as a determining section which determines whether or not at least one of panning imaging and tilting imaging is taking place based on the motion of the image pickup apparatus 100. In the case where panning and tilting occur simultaneously, the vector of one of panning and tilting, or the combined vector of panning and tilting, is monitored. In the case where it is determined that at least one of panning imaging and tilting imaging is taking place while the 3D picture generating section 209 is outputting 3D picture data, the 3D picture generating section 209 switches its output from 3D picture data to 2D picture data. When it is subsequently determined that none of panning imaging and tilting imaging is taking place anymore, the 3D picture generating section 209 switches its output from 2D picture data to 3D picture data.

This operation is described in detail with reference to the flow chart of FIG. 3.

Figure 3:
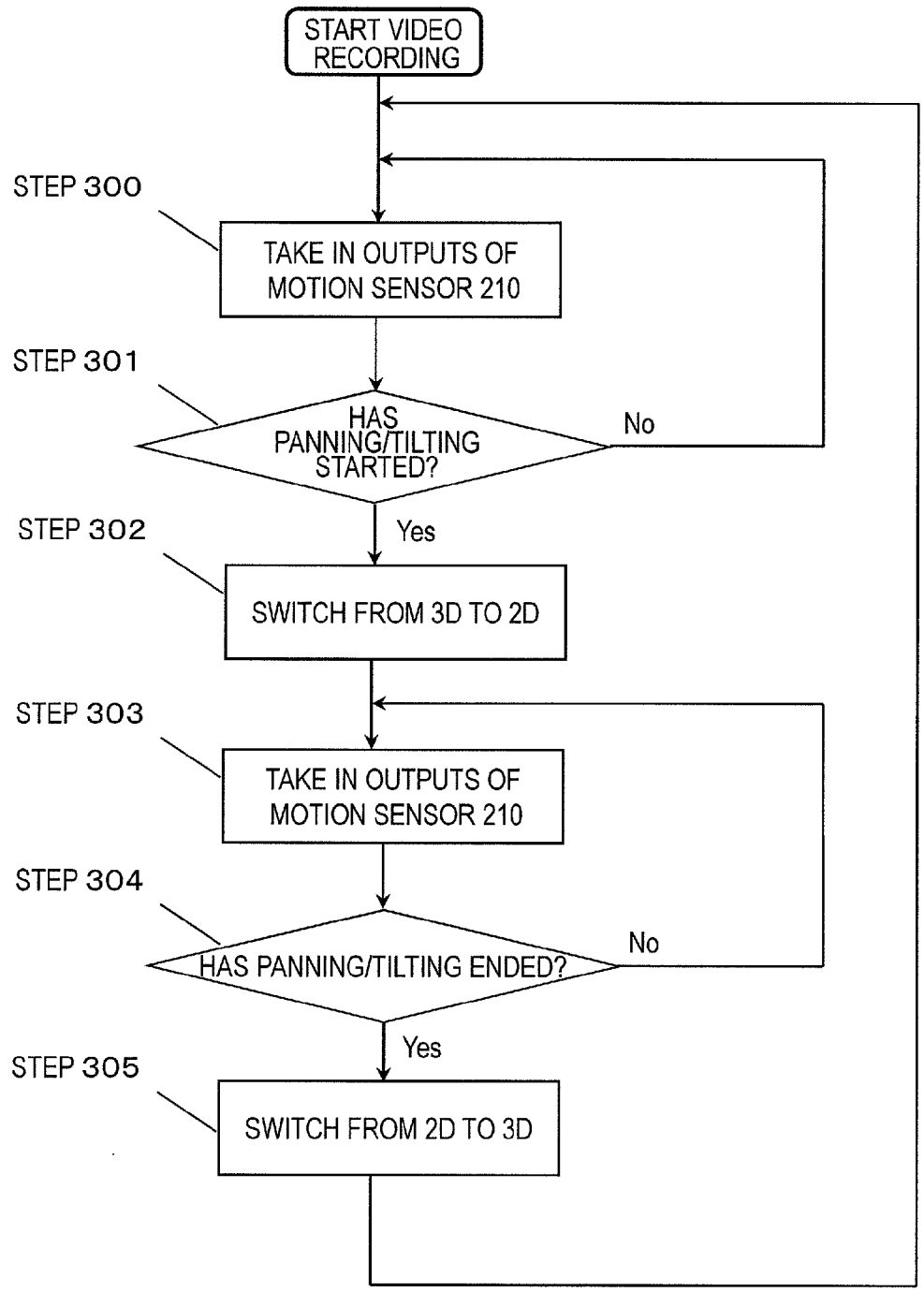
FIG. 3 is a flow chart illustrating the operation of the image pickup apparatus according to the first embodiment of the present invention.

FIG. 3 is a flow chart illustrating the operation of switching between 3D imaging and 2D imaging according to the first embodiment. An algorithm for implementing this operation is installed in the form of hardware or software in the system control section 208.

In FIG. 3, when video recording begins, outputs of the horizontal/vertical motion sensor 210 start to be taken in (Step 300). The horizontal/vertical motion sensor 210 in the first embodiment is a gyro sensor (angular velocity sensor), and the data taken into the system control section 208 is the angular velocity of the motion of the image pickup apparatus 100. If the person taking the image holds the image pickup apparatus 100 in hands and pans during imaging, signals output from the horizontal/vertical motion sensor 210 are, for example, as illustrated in FIG. 4.

Figure 4:
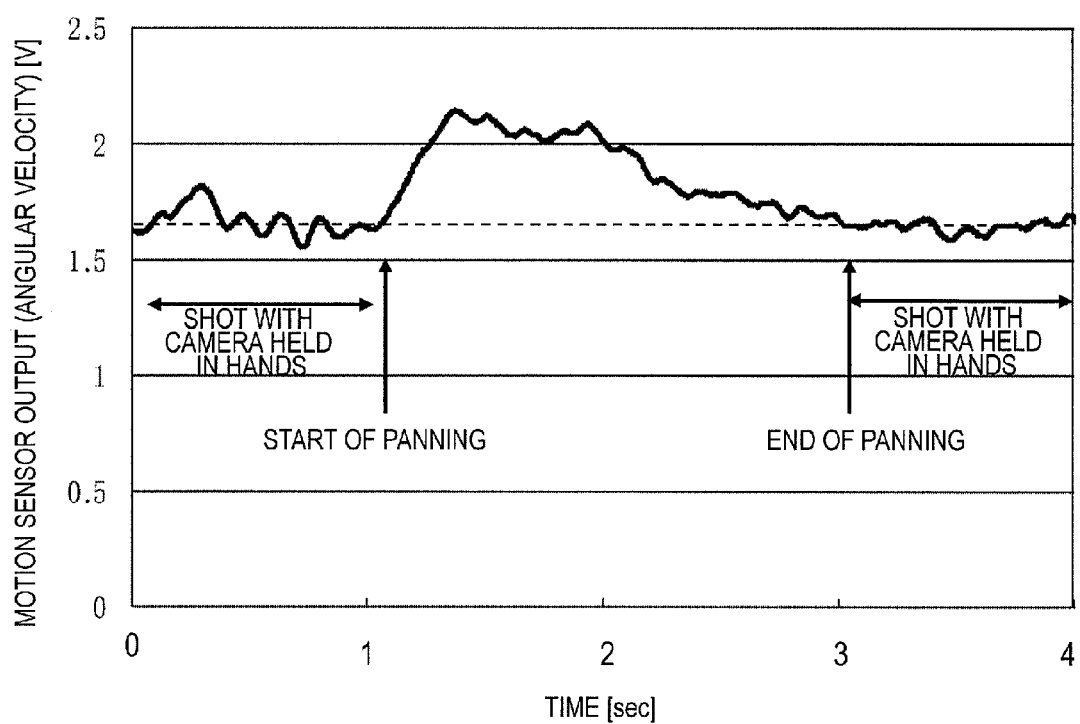
FIG. 4 is a diagram illustrating output signals of a horizontal/vertical motion sensor during panning according to the first embodiment of the present invention.

In FIG. 4, the axis of ordinate represents the output (in volts) of the horizontal/vertical motion sensor and the axis of abscissa represents time (in seconds). The solid line represents the output of the horizontal/vertical motion sensor 210, and the dotted line represents the output level (center potential) of the horizontal/vertical motion sensor 210 that is registered when the image pickup apparatus is fixed to, for example, a tripod and is completely still. As illustrated in FIG. 4, the output of the horizontal/vertical motion sensor 210 changes randomly above and below the center potential due to camera shake when the person taking the image is imaging holding the image pickup apparatus 100 in hands. During panning, the image pickup apparatus 100 shifts positions in a continuous manner in a constant direction, and the output of the horizontal/vertical motion sensor 210 is therefore unevenly distributed on one side of the center potential.

In Step 301 of FIG. 3, changes in the output of the horizontal/vertical motion sensor 210 are monitored continuously and, if the output of the horizontal/vertical motion sensor 210 is unevenly distributed on one side of the center potential for a given period of time, it is determined that panning or tilting has started. If the output of the horizontal/vertical motion sensor 210 changes above and below the center potential for a period shorter than the given period of time, on the other hand, it is determined that panning nor tilting is taking place and the system control section 208 returns to Step 300. When it is determined in Step 301 that panning or tilting is taking place, the system control section 208 proceeds to Step 302, where switching is made automatically from 3D video recording to 2D video recording. In the case where the motion of the image pickup apparatus 100 is slow, too, the automatic switching from 3D video recording to 2D video recording may be made if the image pickup apparatus 100 keeps moving for the given period of time or longer.

Next, the monitoring of the output of the horizontal/vertical motion sensor 210 is continued (Step 303) and, if the output of the horizontal/vertical motion sensor 210 changes above and below the center potential for a period shorter than the given period of time, it is determined that panning or tilting has ended (Step 304) and the system control section 208 proceeds to Step 305, where switching is made from 2D video recording to 3D video recording. When it is determined that panning or tilting has not ended, the system control section 208 returns to Step 303 to continue monitoring.

The switching from 3D imaging to 2D imaging may use a method in which only images obtained from one of the two camera systems included in the image pickup apparatus 100 are supplied to the 3D picture generating section 209 to output pictures generated from images of one camera system alone, or a method in which a 2D picture is composited from images of the two camera systems.

As described above, according to the first embodiment, picture data appropriate for viewing is obtained in 3D picture imaging by switching the pictures to be taken from 3D pictures to 2D pictures automatically in a situation where a 3D picture taken may give a viewer a sense of strangeness due to camera operation such as panning or tilting.

Second Embodiment

As a second embodiment of the present invention, an example is described below in which switching is made between 3D imaging and 2D imaging depending on the magnitude of camera shake which occurs when the image pickup apparatus 100 is held in hands during imaging, instead of depending on camera operation such as panning or tilting. The basic structure of the image pickup apparatus 100 in the second embodiment is the same as the one illustrated in FIGS. 1 and 2, and a description thereof is therefore omitted.

In video imaging with an image pickup apparatus, the blurring of a taken picture due to camera shake is inevitable if the image pickup apparatus is held in hands by a person taking the image during imaging. An example of known technologies for correcting picture blurring due to camera shake during imaging involves detecting a motion vector between consecutive images and cutting out a part of an image based on the motion vector. In another existing correction technology, the motion (e.g., angular velocity) of the camera caused by camera shake is detected and a special optical lens is moved within a plane orthogonal to the optical axis in accordance with the detected camera motion, to thereby move the optical axis and correct the shift of the picture due to camera shake. It is difficult to completely remove picture blurring due to camera shake under any conditions. Therefore, when the magnitude of picture blurring due to camera shake is large, for example, in the case of imaging while walking or imaging while riding in an automobile or other vehicles, a 3 D picture taken can give a significant sense of strangeness to a viewer because of the picture blurring.

The second embodiment lessens this sense of strangeness felt by a viewer by determining the motion (the magnitude of camera shake) of the image pickup apparatus 100 from the output of the horizontal/vertical motion sensor 210 and switching the pictures to be video-recorded from 3D pictures to 2D pictures when it is detected from the determined motion that the magnitude of camera shake is equal to or larger than a given level.

The system control section 208 functions as a determining section which determines the state of shaking of the image pickup apparatus 100 due to camera shake based on the motion of the image pickup apparatus 100. In the case where it is determined that the shaking of the image pickup apparatus 100 is equal to or larger than a given level while the 3D picture generating section 209 is outputting 3D picture data, the 3D picture generating section 209 switches its output from 3D picture data to 2D picture data. When it is subsequently determined that the shaking of the image pickup apparatus 100 is less than the given level, the 3D picture generating section 209 switches its output from 2D picture data to 3D picture data.

This operation is described in detail with reference to the flow chart of FIG. 5.

Figure 5:
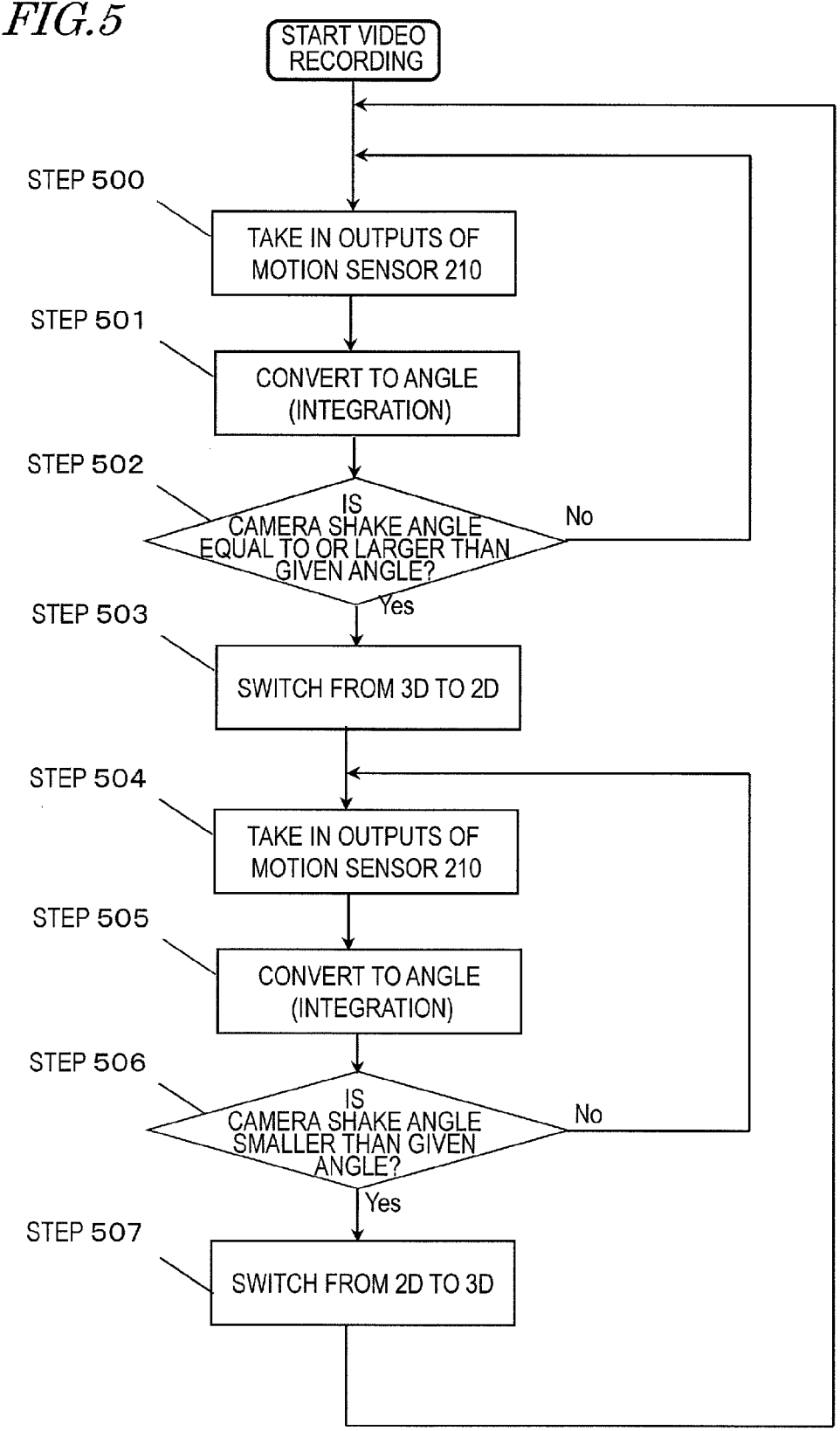
FIG. 5 is a flow chart illustrating the operation of an image pickup apparatus according to a second embodiment of the present invention.

FIG. 5 is a flow chart illustrating the operation of switching between 3D imaging and 2D imaging according to the second embodiment. An algorithm for implementing this operation is installed in the form of hardware or software in the system control section 208.

In FIG. 5, when video recording begins, outputs of the horizontal/vertical motion sensor 210 start to be taken in (Step 500). The horizontal/vertical motion sensor 210 in the second embodiment is a gyro sensor (angular velocity sensor), and the data taken into the system control section 208 is the angular velocity of the motion of the image pickup apparatus 100. Next, the outputs are integrated (Step 501). The travel angle of the image pickup apparatus 100 is obtained through this integration. Prior to the integration, an amount corresponding to the center potential is subtracted from each output of the horizontal/vertical motion sensor 210.

In Step 502, when the travel angle of the image pickup apparatus 100 obtained in Step 501 is equal to or larger than a given angle, it is determined that the magnitude of camera shake is large and the system control section 208 proceeds to Step 503, where switching is made automatically from 3D video recording to 2D video recording. When the travel angle of the image pickup apparatus 100 is smaller than the given angle, on the other hand, the system control section 208 returns to Step 500 to continue 3D imaging.

In the case where switching from 3D video recording to 2D video recording has been made in Step 503, the system control section 208 continues to take in outputs of the horizontal/vertical motion sensor 210 in Step 504, and the outputs are integrated in Step 505 to obtain the travel angle of the image pickup apparatus 100. In Step 506, when the travel angle of the image pickup apparatus 100 obtained in Step 505 is reduced to be smaller than the given angle, it is determined that the magnitude of camera shake has become small and the system control section 208 proceeds to Step 507, where switching is made automatically from 2D video recording to 3D video recording. When it is determined in Step 506 that the magnitude of camera shake remains large, the system control section 208 returns to Step 504 to continue monitoring the output of the horizontal/vertical motion sensor 210.

As described above, according to the second embodiment, pictures appropriate for viewing are taken in 3D picture imaging by switching the pictures to be taken from 3D pictures to 2D pictures automatically in a situation where a picture taken may give a viewer a sense of strangeness due to camera shake by a person taking the image.

The magnitude of camera shake can be determined by a method illustrated in FIGS. 6 and 7, instead of the method described with reference to FIG. 5.

Figure 6:
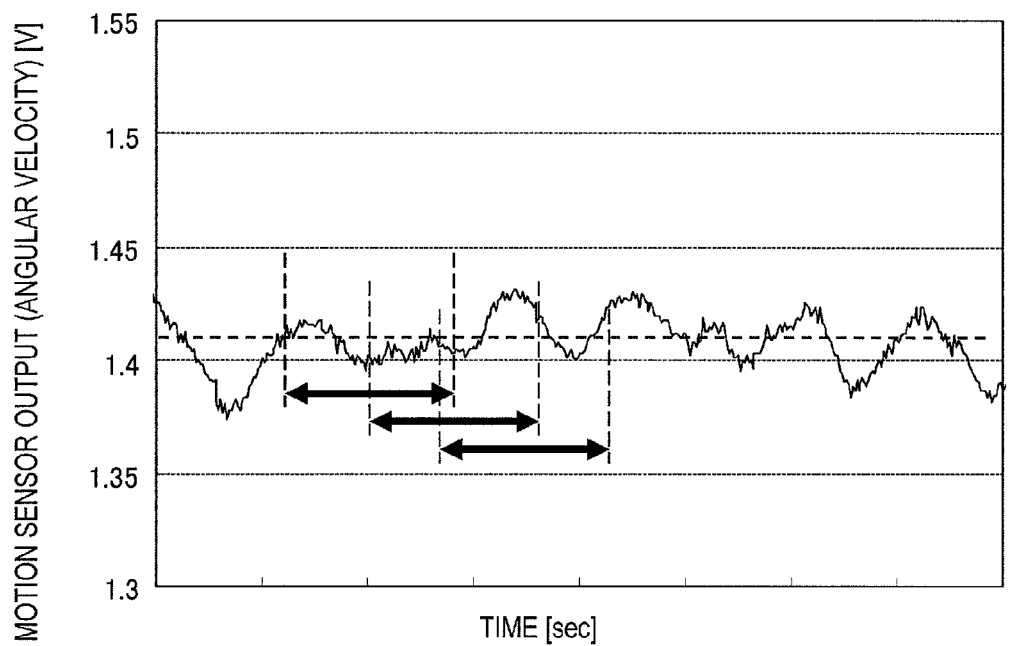
FIG. 6 is a diagram illustrating output signals of a horizontal/vertical motion sensor during imaging according to the second embodiment of the present invention.

FIG. 6 is an example of the output (the angular velocity of camera shake) of the horizontal/vertical motion sensor 210 that is observed when the image pickup apparatus 100 is held in hands during imaging. In FIG. 6, the axis of ordinate represents the output (in volts) of the horizontal/vertical motion sensor and the axis of abscissa represents time (in seconds). The solid line represents the output of the horizontal/vertical motion sensor 210, and the dotted line represents the output level (center potential) of the horizontal/vertical motion sensor 210 that is registered when the image pickup apparatus 100 is fixed to, for example, a tripod and is completely still.

As illustrated in FIG. 6, low, cyclic motions are dominant in camera shake. Therefore, when determined only from the magnitude of the travel angle that is obtained by the integration of angular velocities as in the example of FIG. 5, the magnitude of camera shake changes cyclically, and the resultant frequent switches between 3D imaging and 2D imaging may produce pictures more unsightly than uncorrected pictures. As a solution, a mean square value of outputs of the horizontal/vertical motion sensor 210 within a section indicated by an arrow in FIG. 6 is calculated, and then the section for which the mean square value is calculated is moved repeatedly to grasp the tendency of the magnitude of camera shake in a given period (prior to calculating the mean square value, an amount corresponding to the center potential is subtracted from each output of the horizontal/vertical motion sensor 210). For example, when a section has a large mean square value, it is surmised that, in this section, the image pickup apparatus 100 is in a state where the magnitude of camera shake is large such as continuous imaging by a person taking the image who is walking. By determining the magnitude of camera shake based on this tendency and making switching between 3D imaging and 2D imaging accordingly, frequent switches between 3D imaging and 2D imaging is avoided and pictures of more desirable quality are taken.

Figure 7:
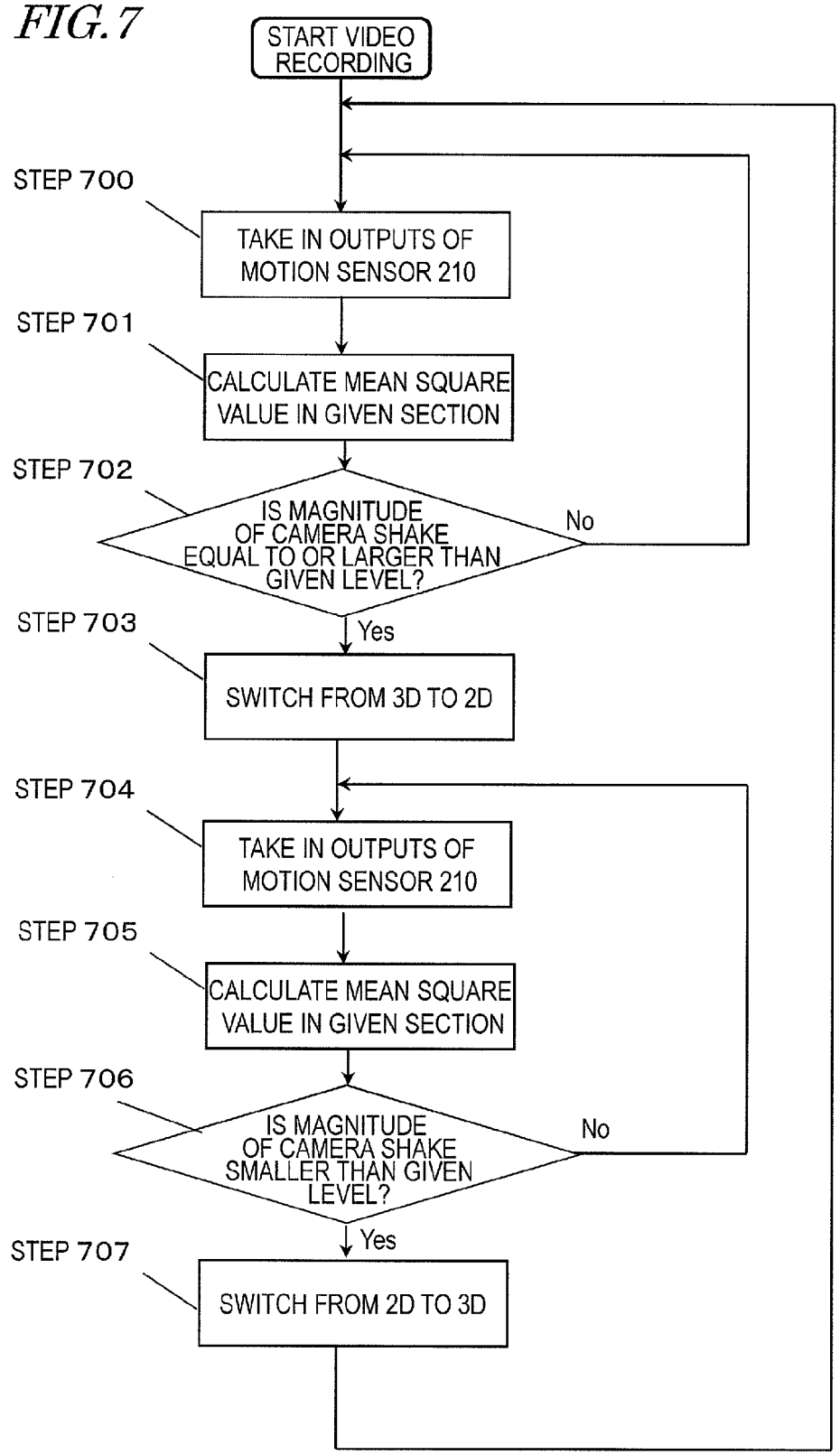
FIG. 7 is a flow chart illustrating the operation of the image pickup apparatus according to the second embodiment of the present invention.

FIG. 7 is a flow chart of the operation of switching between 3D imaging and 2D imaging with the use of the method described above which calculates the mean square value. Steps 701, 702, 705, and 706 in FIG. 7 are steps of obtaining the magnitude of camera shake by calculating the mean square value of output values of the horizontal/vertical motion sensor 210 in a given section.

In FIG. 7, when video recording begins, outputs of the horizontal/vertical motion sensor 210 start to be taken in (Step 700). The mean square value of the outputs of the horizontal/vertical motion sensor 210 in a given section is calculated next (Step 701).

In Step 702, when the calculated mean square value is equal to or larger than a given value, it is determined that the magnitude of camera shake is large and the system control section 208 proceeds to Step 703, where switching is made automatically from 3D video recording to 2D video recording. When the calculated mean square value of the image pickup apparatus 100 is smaller than the given value, on the other hand, the system control section 208 returns to Step 700 to continue 3D imaging.

In the case where switching from 3D video recording to 2D video recording has been made in Step 703, the system control section 208 continues to take in outputs of the horizontal/vertical motion sensor 210 in Step 704, and the mean square value is calculated for another given section in Step 705. In Step 706, when the mean square value obtained in Step 705 is reduced to be smaller than the given value, it is determined that the magnitude of camera shake has become small and the system control section 208 proceeds to Step 707, where switching is made automatically from 2D video recording to 3D video recording. When it is determined in Step 706 that the magnitude of camera shake remains large, the system control section 208 returns to Step 704 to continue monitoring the output of the horizontal/vertical motion sensor 210. By automatically switching the pictures to be taken from 3D pictures to 2D pictures in this manner, pictures appropriate for viewing are taken.

Third Embodiment

An image pickup apparatus 200 according to a third embodiment of the present invention is described with reference to FIG. 8 and FIG. 9. The image pickup apparatus 200 is a modification of the image pickup apparatus 100 (FIG. 2) in which a stereo base changing section 800 for varying the physical distance (hereinafter, referred to as stereo base) between the imaging lenses 100R and 100L is added and controlled by a system control section 801. The basic operation of the system control section 801 is the same as that of the system control section 208 (FIG. 2). In the image pickup apparatus 200 of FIG. 8, components that are the same as those in the image pickup apparatus 100 are denoted by the same reference symbols to avoid repeating the same description.

Figure 8:
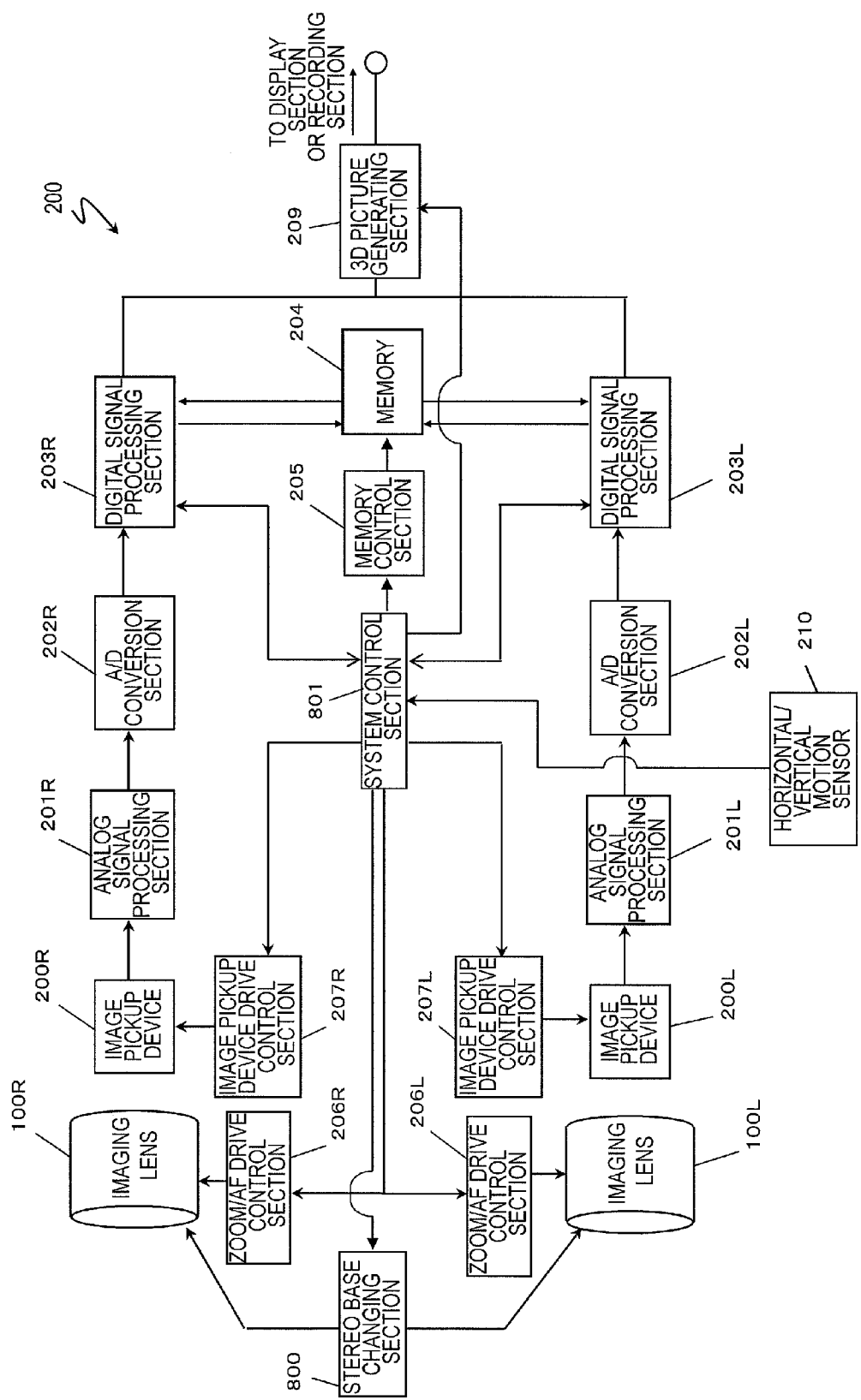
FIG. 8 is a diagram illustrating the internal structure of an image pickup apparatus according to a third embodiment of the present invention.

FIG. 8 is a block diagram illustrating the internal structure of the image pickup apparatus 200 according to the third embodiment of the present invention. The two imaging lenses (optical systems) 100R and 100L are disposed side by side and each form a subject image. The stereo base changing section 800 is constituted by a mechanism for freely changing the stereo base, which is the distance between the optical axes of the two imaging lenses 100R and 100L, and a driving motor. The stereo base changing section 800 changes the stereo base as instructed by an instruction signal from the system control section 801. To change the stereo base, the stereo base changing section 800 moves at least one of the imaging lenses 100R and 100L, which are optical systems, in a direction perpendicular to the optical axis in accordance with the motion of the image pickup apparatus 200.

Changing the stereo base between the two imaging lenses 100R and 100L with the stereo base changing section 800 changes the stereoscopic effect (pop-out amount) of a 3D image taken. Changing the stereo base equals changing the parallax between two images (the left image and the right image). An adjustment of the parallax between two images for adjusting the parallax and the stereoscopic effect (pop-out amount) of a 3D picture can be made by, for example, a method that uses image processing to adjust the amount of spatial misalignment in the horizontal direction between two images (the left image and the right image) obtained from two camera systems. To give another example, the method disclosed in Japanese Patent Application Laid-open No. 2010-45584 can be employed.

As described in the first embodiment of the present invention, panning or tilting operation during imaging may lead to a sense of strangeness felt by a viewer of a 3D picture.

The third embodiment lessens this sense of strangeness felt by a viewer by determining the motion (imaging conditions) of the image pickup apparatus 200 from the output of the horizontal/vertical motion sensor 210 and freely changing the stereo base between the two imaging lenses 100R and 100L to adjust the stereoscopic effect (pop-out amount) of a 3D picture to be taken when the panning or tilting operation described above is detected from the determined motion.

The stereo base changing section 800 shortens the stereo base and thereby reduces the stereoscopic effect of a 3D picture taken when it is determined that the image pickup apparatus 200 is in at least one of panning operation and tilting operation. If it is subsequently determined that none of panning and tilting is taking place anymore, the stereo base changing section 800 lengthens the stereo base and thereby enhances the stereoscopic effect of a 3D picture taken (in other words, brings the stereoscopic effect back to its original level).

This operation is described in detail with reference to the flow chart of FIG. 9.

Figure 9:
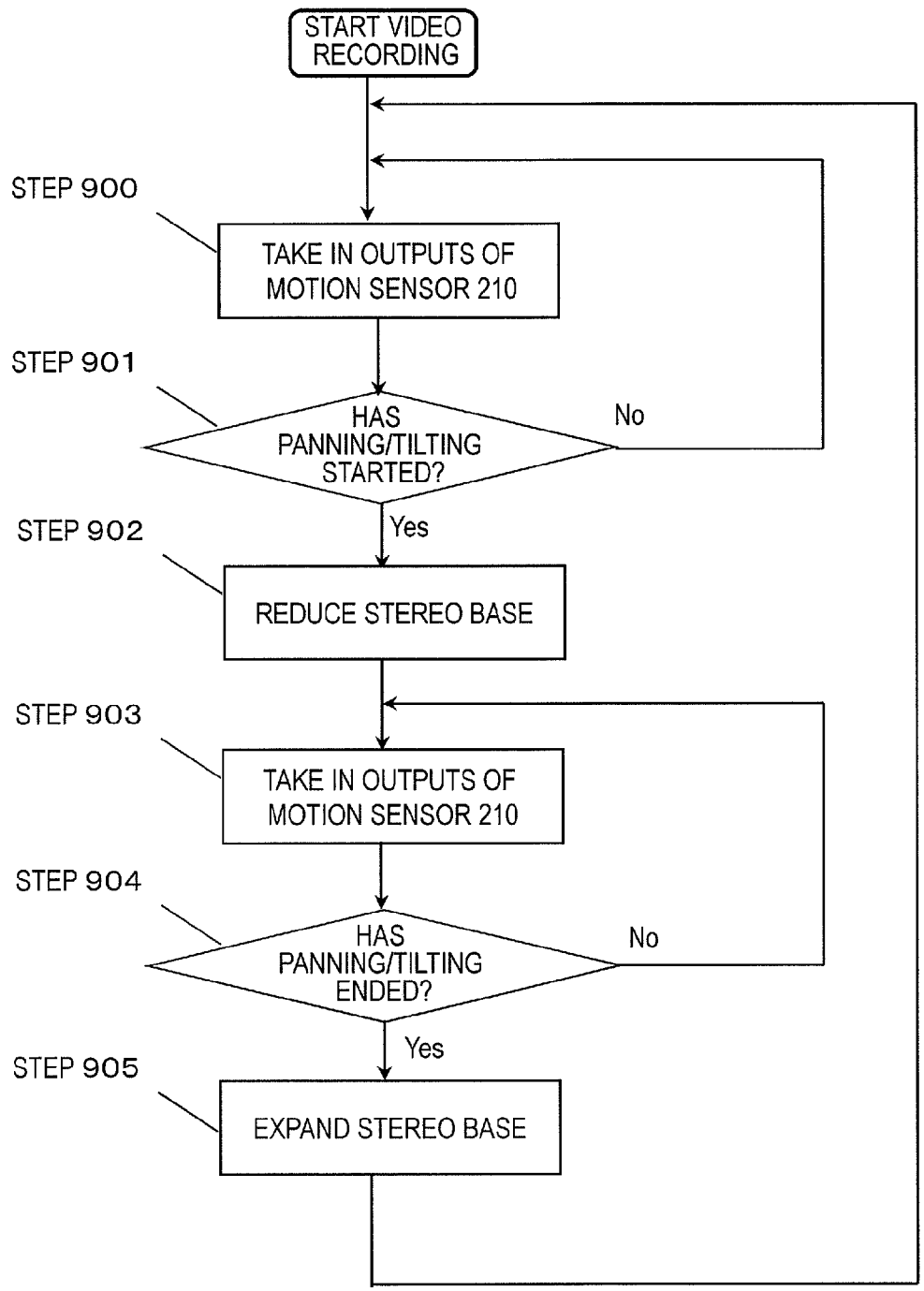
FIG. 9 is a flow chart illustrating the operation of the image pickup apparatus according to the third embodiment of the present invention.

FIG. 9 is a flow chart illustrating the operation of changing the stereo base between the imaging lenses 100R and 100L according to the third embodiment. An algorithm for implementing this operation is installed in the form of hardware or software in the system control section 801.

In FIG. 9, when video recording begins, outputs of the horizontal/vertical motion sensor 210 start to be taken in (Step 900). The horizontal/vertical motion sensor 210 in the third embodiment is a gyro sensor (angular velocity sensor), and the data taken into the system control section 801 is the angular velocity of the motion of the image pickup apparatus 200. If the person taking the image holds the image pickup apparatus 200 in hands and pans during imaging, signals output from the horizontal/vertical motion sensor 210 are, for example, as illustrated in FIG. 4.

In FIG. 4, the axis of ordinate represents the output (in volts) of the horizontal/vertical motion sensor and the axis of abscissa represents time (in seconds). The solid line represents the output of the horizontal/vertical motion sensor 210, and the dotted line represents the output level (center potential) of the horizontal/vertical motion sensor 210 that is registered when the image pickup apparatus 200 is fixed to, for example, a tripod and is completely still. As illustrated in FIG. 4, the output of the horizontal/vertical motion sensor 210 changes randomly above and below the center potential due to camera shake when the person taking the image is imaging holding the image pickup apparatus 200 in hands. During panning, the image pickup apparatus 200 shifts positions in a continuous manner in a constant direction, and the output of the horizontal/vertical motion sensor 210 is therefore unevenly distributed on one side of the center potential.

In Step 901 of FIG. 9, changes in the output of the horizontal/vertical motion sensor 210 are monitored continuously and, if the output of the horizontal/vertical motion sensor 210 is unevenly distributed on one side of the center potential for a given period of time, it is determined that panning or tilting has started (Step 901). If the output of the horizontal/vertical motion sensor 210 changes above and below the center potential for a period shorter than the given period of time, on the other hand, it is determined that panning nor tilting is taking place and the system control section 801 returns to Step 900. When it is determined in Step 901 that panning or tilting is taking place, the system control section 801 proceeds to Step 902, where the stereo base between the imaging lenses 100R and 100L is changed. In this case, changing the stereo base in a direction that reduces the stereoscopic effect (pop-out amount) of a 3D picture taken is preferred and, specifically, the stereo base between the imaging lenses 100R and 100L is shortened.

Next, the monitoring of the output of the horizontal/vertical motion sensor 210 is continued and, if the output of the horizontal/vertical motion sensor 210 changes above and below the center potential for a period shorter than the given period of time, it is determined that panning or tilting has ended (Step 904) and the system control section 801 proceeds to Step 905, where the stereo base between the imaging lenses 100R and 100L is expanded back to the original length.

As described above, according to the third embodiment, pictures appropriate for viewing are obtained in 3D picture imaging by changing the stereo base in a situation where a 3D picture taken may give a viewer a sense of strangeness due to camera operation such as panning or tilting.

Figure 10:
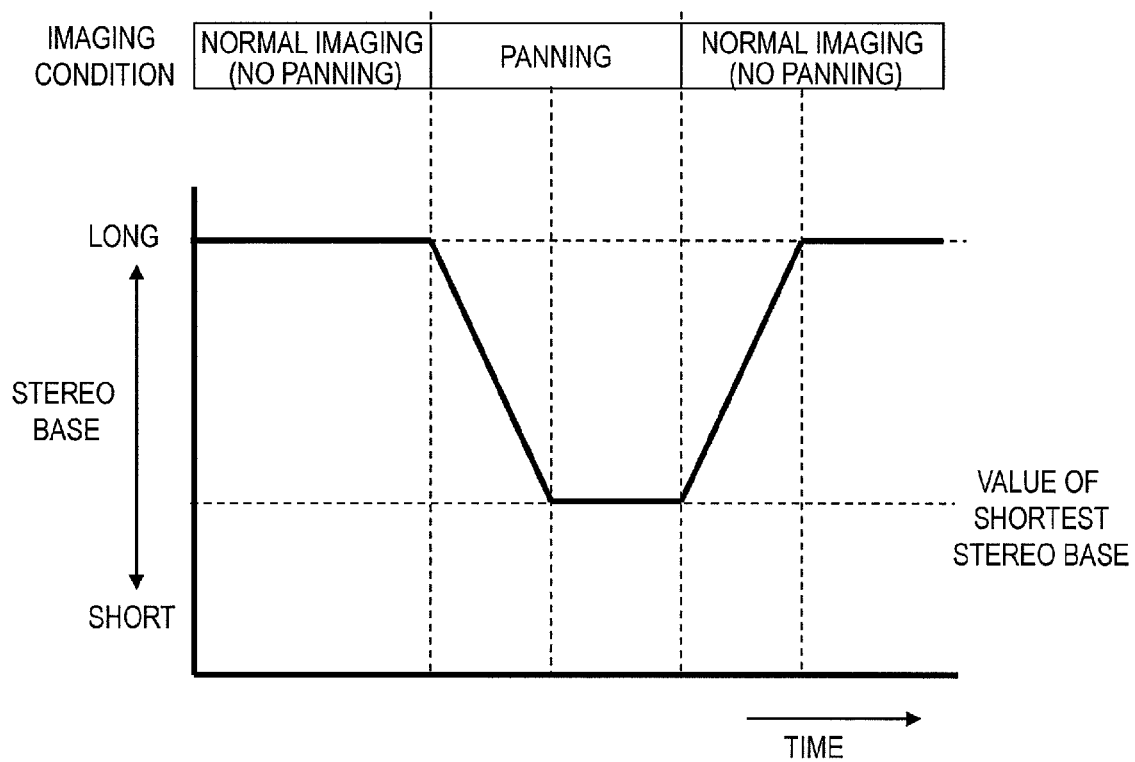
FIG. 10 is a diagram illustrating a stereo base changing method according to the third embodiment of the present invention.

The stereo base may be changed by, for example, keeping two stereo base values for two states: normal imaging (no panning or tilting) and panning or tilting imaging, and switching between the two values. However, a steep change in stereo base rapidly changes the stereoscopic effect of a 3D picture taken and is therefore undesirable. It is preferred to change the stereo base gradually as illustrated in FIG. 10. FIG. 10 is a diagram illustrating a method of changing the stereo base. In FIG. 10, the axis of ordinate represents the length of the stereo base and the axis of abscissa represents time (in seconds). By gradually changing the stereo base after panning or tilting is detected, and also gradually returning the stereo base back to its original length after panning or tilting is ended, the sense of strangeness felt by a viewer is lessened even more.

Fourth Embodiment

As a fourth embodiment of the present invention, an example is described below in which the stereo base is changed depending on the magnitude of camera shake which occurs when the image pickup apparatus 200 is held in hands during imaging, instead of depending on camera operation such as panning or tilting. The basic structure of the image pickup apparatus 200 in the fourth embodiment is the same as the ones illustrated in FIG. 1 and FIG. 8, and a description thereof is therefore omitted.

In video imaging with the image pickup apparatus 200, a 3D picture taken gives a viewer a sense of strangeness because of image blurring due to camera shake as described in the second embodiment.

The fourth embodiment lessens this sense of strangeness felt by a viewer by determining the motion (the magnitude of camera shake) of the image pickup apparatus 200 from the output of the horizontal/vertical motion sensor 210 and changing the stereo base when it is detected from the determined motion that the magnitude of camera shake is equal to or larger than a given level.

The stereo base changing section 800 shortens the stereo base and thereby reduces the stereoscopic effect of a 3D picture taken when it is determined that the shaking of the image pickup apparatus 200 is equal to or larger than the given level. If it is subsequently determined that the shaking of the image pickup apparatus 200 has decreased from the given level or more to less than the given level, the stereo base changing section 800 lengthens the stereo base and thereby enhances the stereoscopic effect of a 3D picture taken (in other words, brings the stereoscopic effect back to its original level).

This operation is described in detail with reference to the flow chart of FIG. 11.

Figure 11:
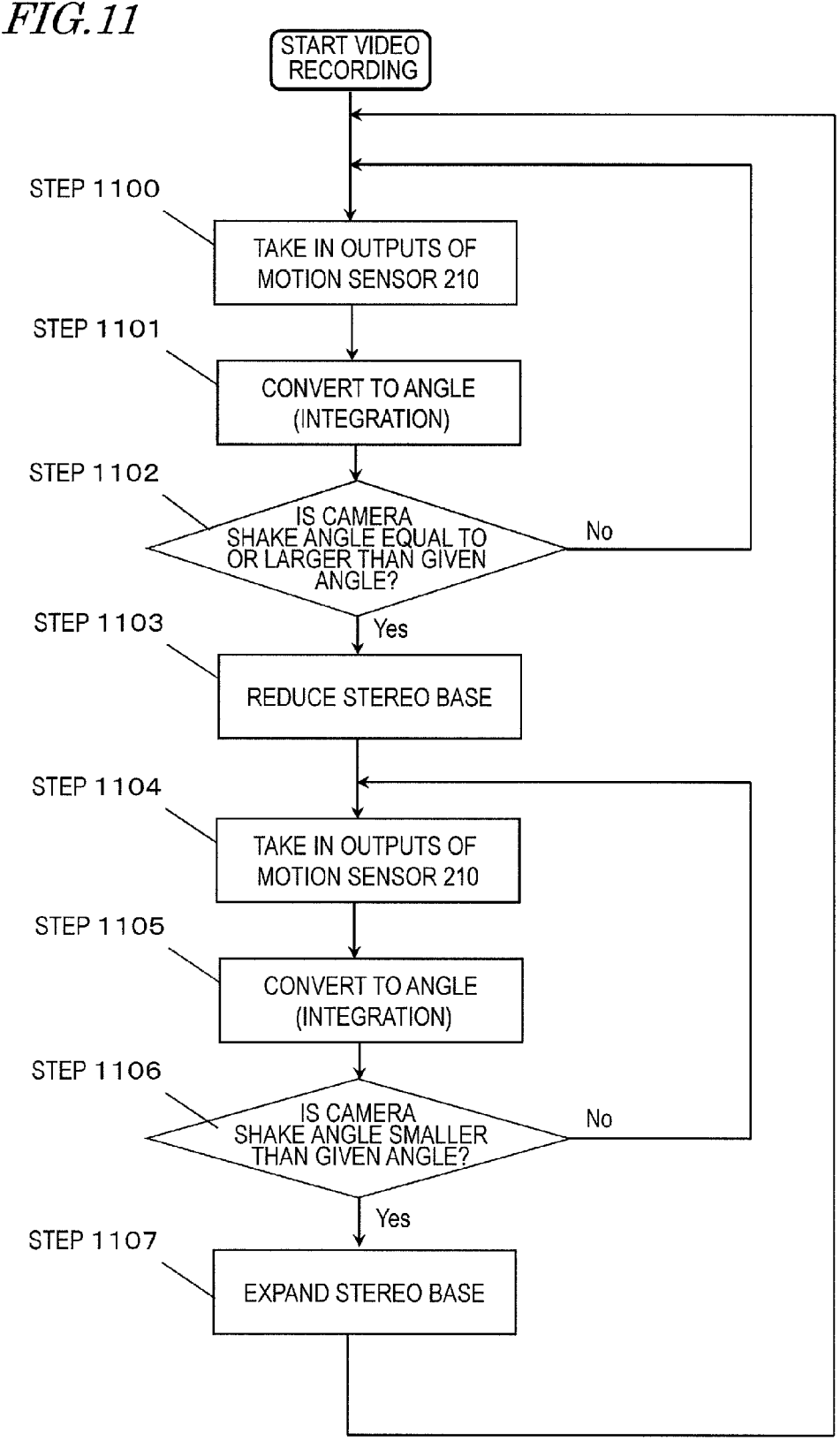
FIG. 11 is a flow chart illustrating the operation of an image pickup apparatus according to a fourth embodiment of the present invention.

FIG. 11 is a flow chart illustrating the operation of changing the stereo base according to the fourth embodiment. An algorithm for implementing this operation is installed in the form of hardware or software in the system control section 801.

In FIG. 11, when video recording begins, outputs of the horizontal/vertical motion sensor 210 start to be taken in (Step 1100). The horizontal/vertical motion sensor 210 in the fourth embodiment is a gyro sensor (angular velocity sensor), and the data taken into the system control section 801 is the angular velocity of the motion of the image pickup apparatus 200. Next, the outputs are integrated (Step 1101). The travel angle of the image pickup apparatus 200 is obtained through this integration. Prior to the integration, an amount corresponding to the center potential is subtracted from each output of the horizontal/vertical motion sensor 210. In Step 1102, when the travel angle of the image pickup apparatus 200 obtained in Step 1101 is equal to or larger than a given angle, it is determined that the magnitude of camera shake is large and the system control section 801 proceeds to Step 1103, where the physical distance (stereo base) between the imaging lenses 100R and 100L is changed. In this case, changing the stereo base in a direction that reduces the stereoscopic effect (pop-out amount) of a 3D picture taken is preferred and, specifically, the stereo base between the imaging lenses 100R and 100L is shortened.

The stereo base is shortened in Step 1103, and the system control section 801 continues to take in outputs of the horizontal/vertical motion sensor 210 in the next step, namely, Step 1104. Then, the outputs are integrated in Step 1105 to obtain the travel angle of the image pickup apparatus 200. In Step 1106, when the travel angle of the image pickup apparatus obtained in Step 1105 is reduced to be smaller than the given angle, it is determined that the magnitude of camera shake (the shaking of the image pickup apparatus 200) has become small, and the system control section 801 proceeds to Step 1107, where the stereo base between the imaging lenses 100R and 100L is expanded back to the original length. When it is determined in Step 1106 that the magnitude of camera shake remains large, the system control section 801 returns to Step 1104 to continue monitoring the output of the horizontal/vertical motion sensor 210.

As described above, according to the fourth embodiment, pictures appropriate for viewing are taken in 3D picture imaging by changing the stereo base and thus adjusting the stereoscopic effect (pop-out amount) of a 3D picture taken in a situation where the person taking the image of a 3D picture causes camera shake and the picture taken may consequently give a viewer a sense of strangeness.

Figure 12:
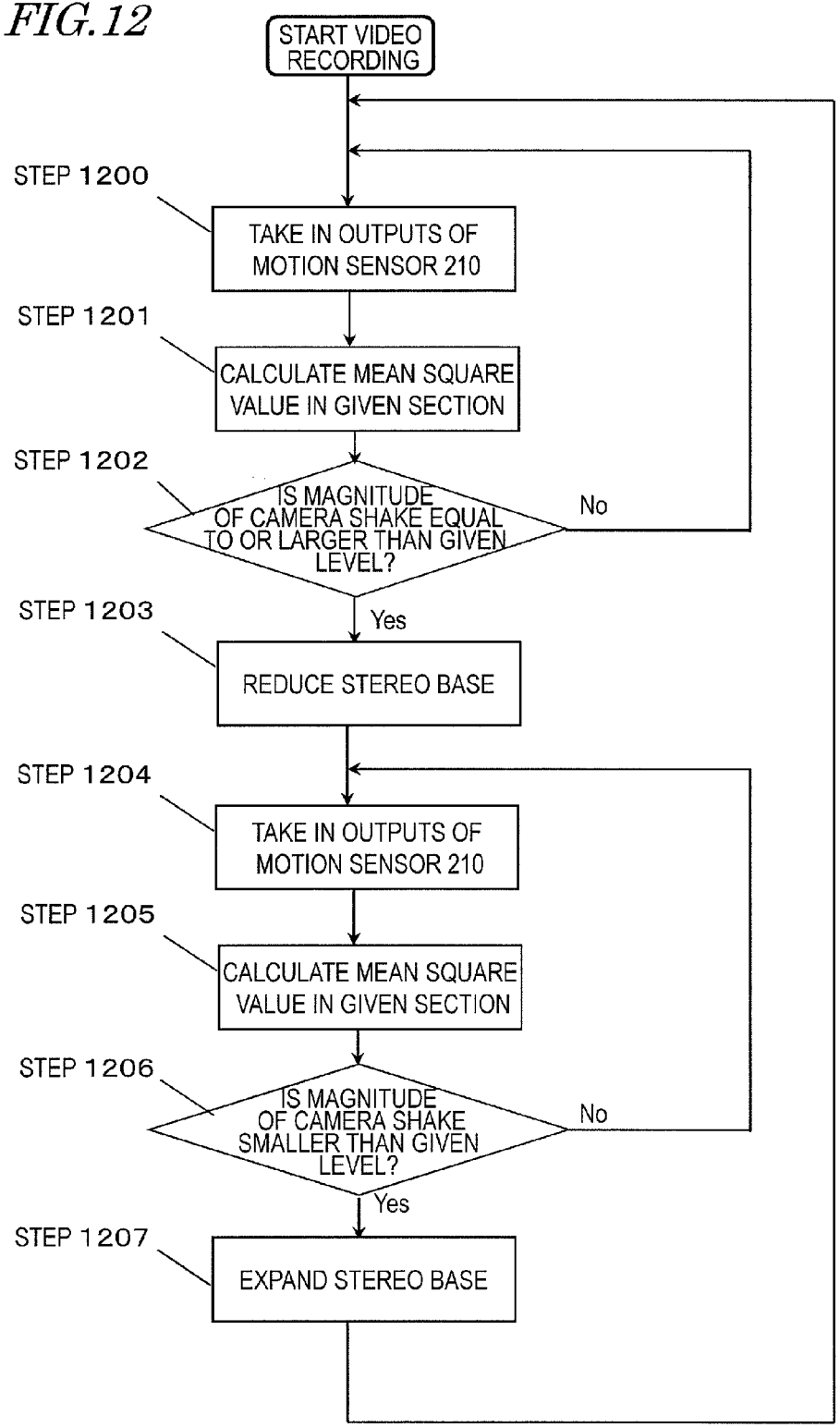
FIG. 12 is a flow chart illustrating the operation of the image pickup apparatus according to the fourth embodiment of the present invention.

As in the case of the method that is employed in the second embodiment, it should be understood that the magnitude of camera shake can be determined by the method as illustrated in FIGS. 6 and 12, in addition to the method described with reference to FIG. 11.

FIG. 12 is a flow chart of the operation of changing the stereo base with the use of the method described above which calculates the mean square value. Steps 1201, 1202, 1205, and 1206 in FIG. 12 are steps of obtaining the magnitude of camera shake by calculating the mean square value of output values of the horizontal/vertical motion sensor 210 in a given section.

In FIG. 12, when video recording begins, outputs of the horizontal/vertical motion sensor 210 start to be taken in (Step 1200). The mean square value of the outputs of the horizontal/vertical motion sensor 210 in a given section is calculated next (Step 1201).

In Step 1202, when the calculated mean square value is equal to or larger than a given value, it is determined that the magnitude of camera shake is large and the system control section 801 proceeds to Step 1203, where the stereo base is reduced. When the calculated mean square value of the image pickup apparatus 200 is smaller than the given value, on the other hand, the system control section 801 returns to Step 1200 to maintain the current stereo base.

In the case where the stereo base is reduced in Step 1203, the system control section 801 continues to take in outputs of the horizontal/vertical motion sensor 210 in Step 1204, and the mean square value is calculated for another given section in Step 1205. In Step 1206, when the mean square value obtained in Step 1205 is reduced to be smaller than the given value, it is determined that the magnitude of camera shake has become small and the system control section 801 proceeds to Step 1207, where the stereo base is lengthened. When it is determined in Step 1206 that the magnitude of camera shake remains large, the system control section 801 returns to Step 1204 to continue monitoring the output of the horizontal/vertical motion sensor 210. By automatically adjusting the stereo base in accordance with the magnitude of the shaking of the image pickup apparatus 200 in this manner, a picture appropriate for viewing is taken.

Figure 13:
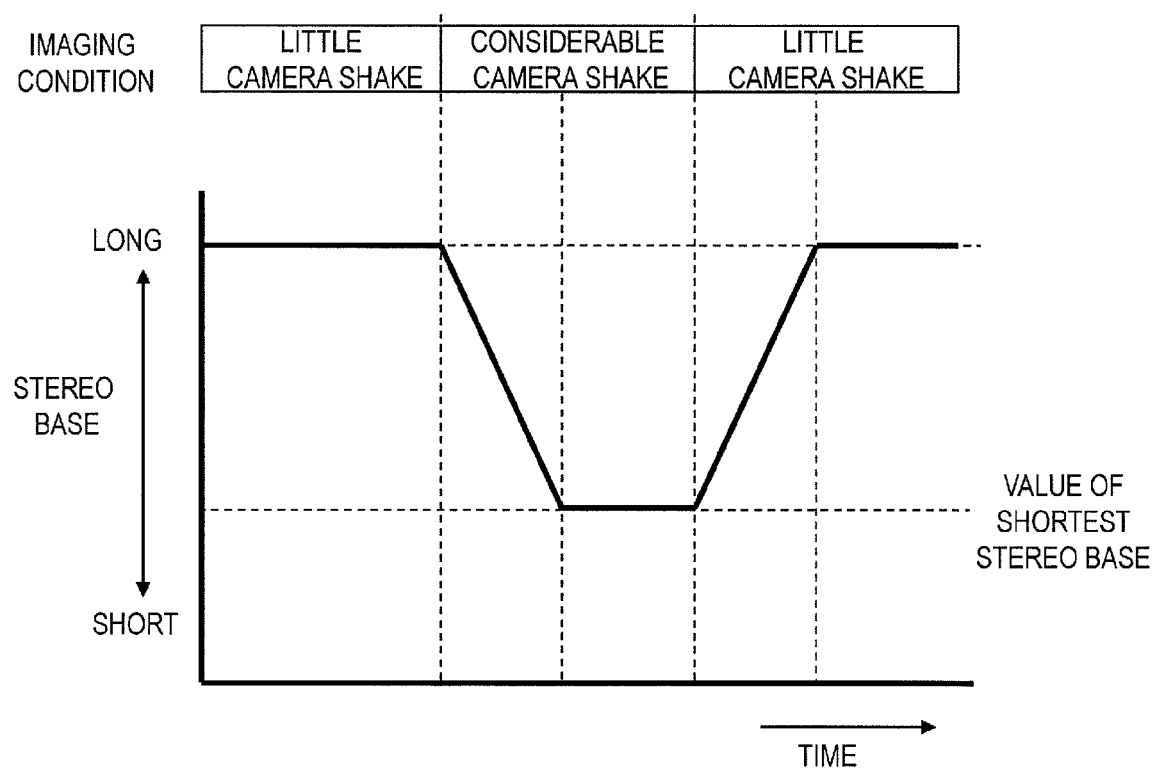
FIG. 13 is a diagram illustrating a stereo base changing method according to the fourth embodiment of the present invention.

As described in the third embodiment with reference to FIG. 10, while the stereo base may be changed by switching between two values, it is preferred to gradually switch the stereo base between the length for when the magnitude of camera shake is small and the length for when the magnitude of camera shake is large in a manner illustrated in FIG. 13. FIG. 13 is a diagram illustrating a stereo base changing method. In FIG. 13, the axis of ordinate represents the length of the stereo base and the axis of abscissa represents time (in seconds). By gradually reducing the stereo base when the magnitude of camera shake is large and also gradually returning the stereo base back to its original length after the magnitude of camera shake becomes small, the sense of strangeness felt by a viewer is lessened even more.

Fifth Embodiment

An image pickup apparatus 300 according to a fifth embodiment of the present invention is described with reference to FIGS. 14 to 17. The fifth embodiment changes the parallax between two images (the left image and the right image) taken via the imaging lenses 100R and 100L instead of changing the stereo base between the imaging lenses 100R and 100L as in the embodiments described above. In the image pickup apparatus 300 of FIG. 14, components that are the same as the already described components of the image pickup apparatus 100 and 200 are denoted by the same reference symbols to avoid repeating the same description.

Figure 14:
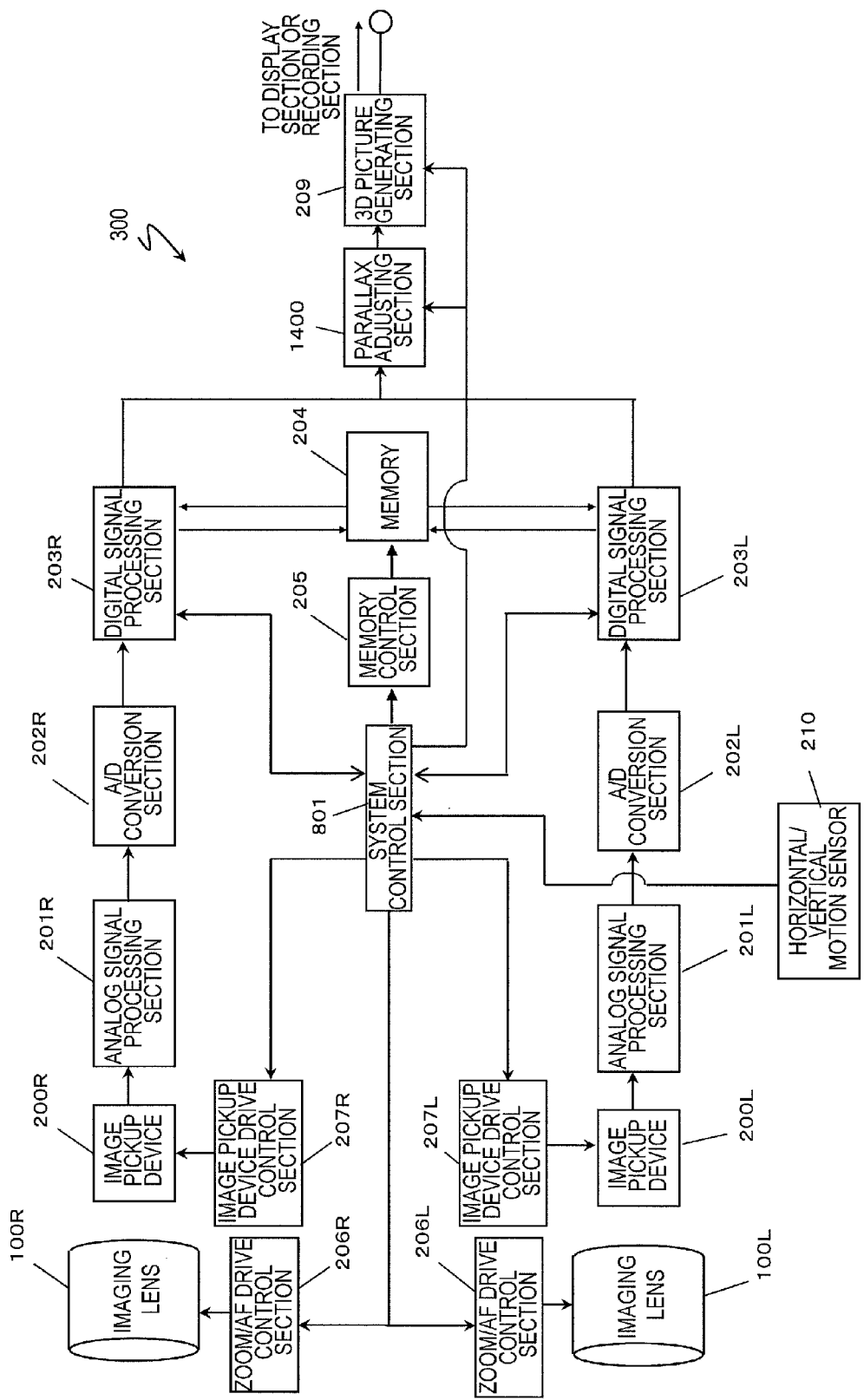
FIG. 14 is a diagram illustrating the internal structure of an image pickup apparatus according to a fifth embodiment of the present invention.

FIG. 14 is a block diagram illustrating the internal structure of the image pickup apparatus 300 according to the fifth embodiment of the present invention. The image pickup apparatus 300 includes a parallax adjusting section 1400. The parallax adjusting section 1400 adjusts the parallax between an image for the right eye and an image for the left eye, which are obtained by picking up subject images, in accordance with the motion of the image pickup apparatus 300. The 3D picture generating section 209 generates 3D picture data based on the adjusted parallax.

The parallax adjusting section 1400 freely changes the parallax between two images (the left image and the right image) taken via the two imaging lenses 100R and 100L. Changing the parallax between two images (the left image and the right image) with the parallax adjusting section 1400 changes the stereoscopic effect (pop-out amount) of a 3D picture taken. An adjustment of the parallax between two images for adjusting the stereoscopic effect (pop-out amount) of a 3D picture can be made by, for example, a method that uses image processing to adjust the amount of spatial misalignment in the horizontal direction between two images (the left image and the right image) obtained from two camera systems. To give another example, the method disclosed in Japanese Patent Application Laid-open No. 2010-45584 can be employed.

Figure 15:
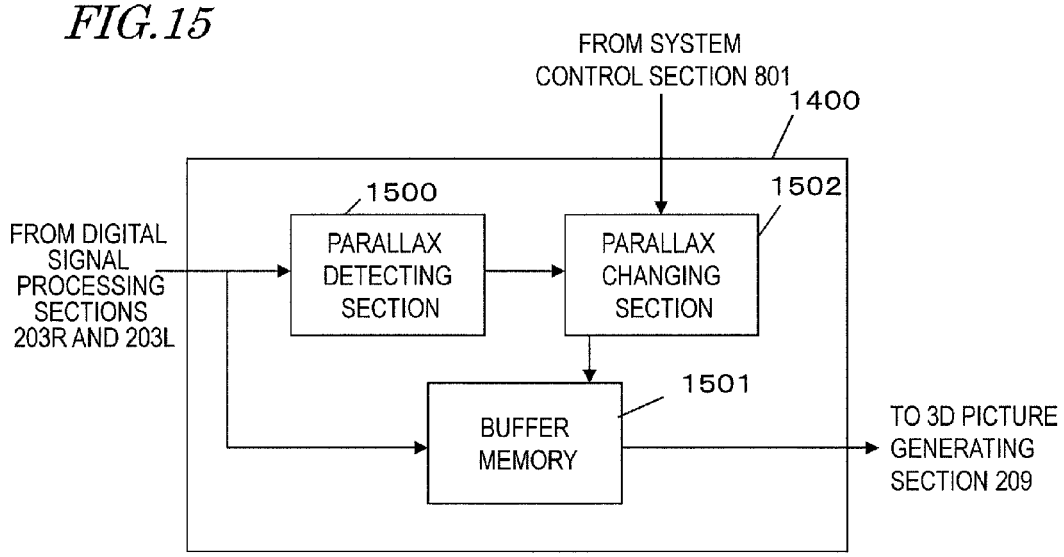
FIG. 15 is a diagram illustrating the internal structure of a parallax adjusting section according to the fifth embodiment of the present invention.

FIG. 15 is a block diagram illustrating the internal structure of the parallax adjusting section 1400. A parallax detecting section 1500 detects the parallax between two images (the left image and the right image) supplied from the digital signal processing sections 203R and 203L. A common way to detect the parallax is to detect the amount of misalignment in the horizontal direction of two images (the left image and the right image). Specifically, one of the two images (the left image and the right image) is used as a reference, a suitable rectangular area is defined in the reference image, and a place in the other image that matches this rectangular area in pattern is searched for by pattern matching to detect the misalignment.

A buffer memory 1501 is a memory that temporarily stores data of two images (the left image and the right image) supplied from the digital signal processing sections 203R and 203L. The buffer memory 1501 cuts an image out of stored image data of two images from an arbitrary point in the horizontal direction based on an instruction from a parallax changing section 1502, which is described later, and outputs the image.

The parallax changing section 1502 specifies the cut-out point in the horizontal direction when an image is read out of the buffer memory 1501, based on an instruction from the system control section 801 and the result of detecting the parallax between two images which is provided by the parallax detecting section 1500.

Figure 17:
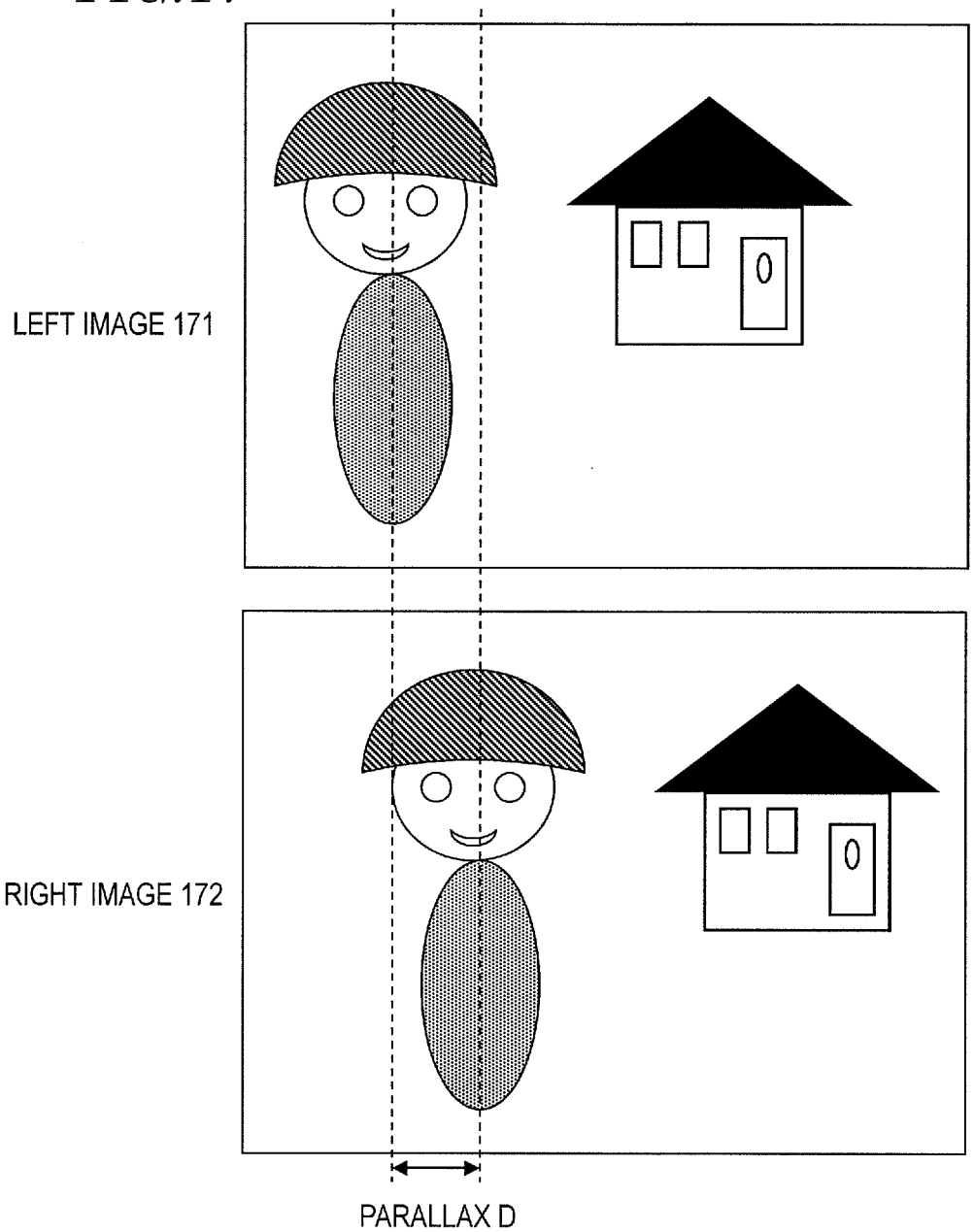
FIG. 17 is a diagram illustrating a parallax according to the fifth embodiment of the present invention.

FIG. 17 is a diagram schematically illustrating a parallax D between two images. In the example of FIG. 17, a place in a left image 171 and a place in a right image 172 that have a matching pattern are identified and the distance between the identified places in the horizontal direction is obtained as the parallax D. The parallax D can be reduced by, for example, shifting the pattern of the left image 171 to the right by several pixels and shifting the pattern of the right image 172 to the left by several pixels. The parallax D can be increased by shifting the pattern of the left image 171 to the left by several pixels and shifting the pattern of the right image 172 to the right by several pixels.

Alternatively, the amount of parallax adjustment may be varied depending on where in an image a pattern is located, such as adjusting the parallax by a large amount for a pattern that is located in the front of an image (the pattern of a person in FIG. 17) while adjusting the parallax by a small amount for a pattern that is located in the back of the image such as the landscape (the pattern of a house in FIG. 17).

The operation in the thus structured fifth embodiment is described below.

As described in the first embodiment and the third embodiment of the present invention, panning or tilting operation during imaging may lead to a sense of strangeness felt by a viewer of a 3D picture.

The fifth embodiment lessens this sense of strangeness felt by a viewer by determining the motion (imaging conditions) of the image pickup apparatus 300 from the output of the horizontal/vertical motion sensor 210 and changing the parallax between two images (the left image and the right image) taken via the two imaging lenses 100R and 100L to adjust the stereoscopic effect (pop-out amount) of a 3D picture taken when the panning or tilting operation described above is detected from the determined motion.

The parallax adjusting section 1400 reduces the parallax and thereby reduces the stereoscopic effect of a 3D picture taken when it is determined that the image pickup apparatus 300 is in at least one of panning operation and tilting operation. If it is subsequently determined that none of panning and tilting is taking place anymore, the parallax adjusting section 1400 increases the parallax and thereby enhances the stereoscopic effect of a 3D picture taken (in other words, brings the stereoscopic effect back to its original level).

This operation is described in detail with reference to the flow chart of FIG. 16.

Figure 16:
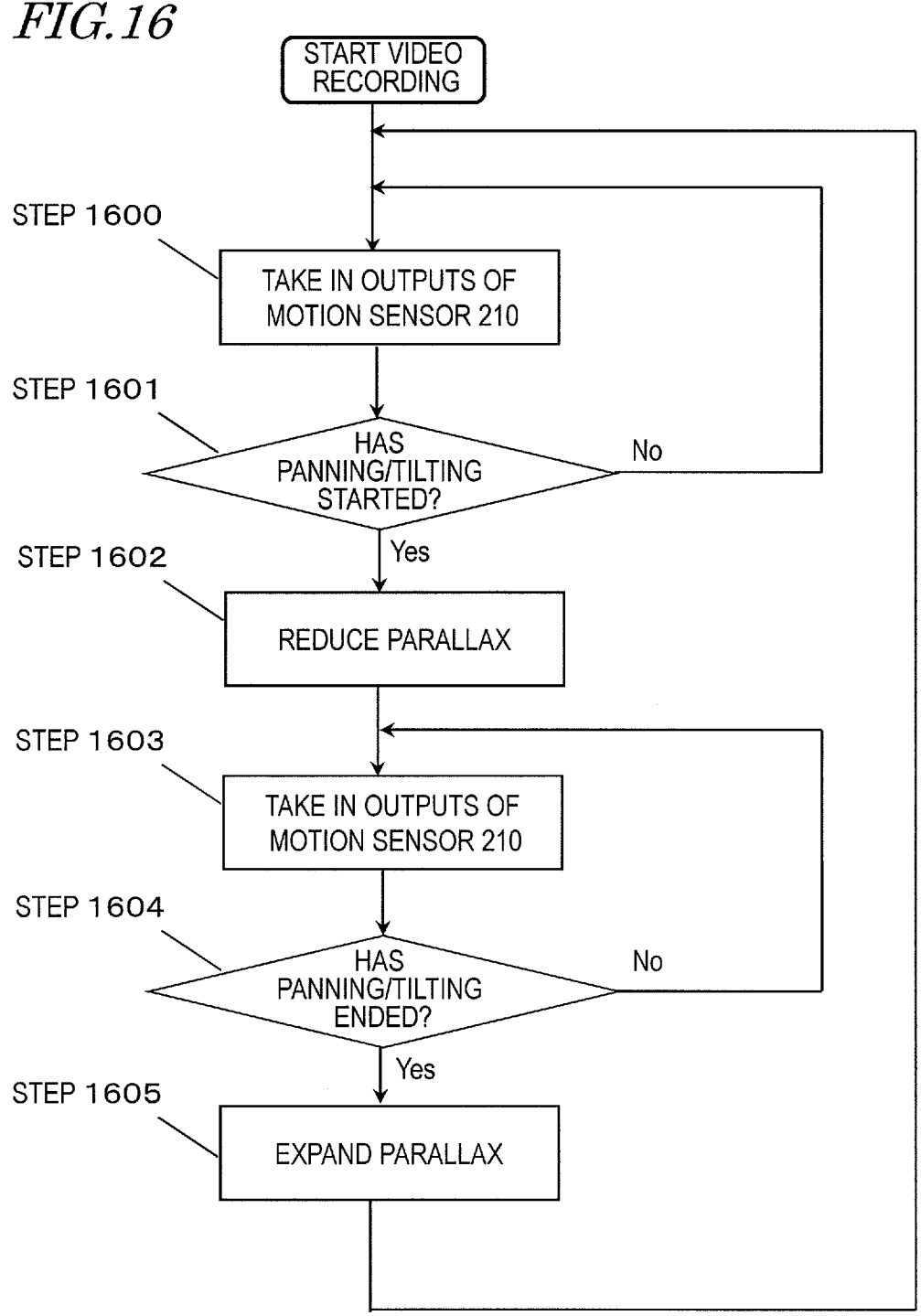
FIG. 16 is a flow chart illustrating the operation of the image pickup apparatus according to the fifth embodiment of the present invention.

FIG. 16 is a flow chart illustrating the operation of changing the parallax between two images according to the fifth embodiment. An algorithm for implementing this operation is installed in the form of hardware or software in the system control section 801.

In FIG. 16, when video recording begins, outputs of the horizontal/vertical motion sensor 210 start to be taken in (Step 1600). The fifth embodiment, too, uses the same method that is employed in the first embodiment and the third embodiment to detect panning and tilting. When it is determined in Step 1601 that panning or tilting is taking place, the system control section 801 proceeds to Step 1602, where the parallax changing section 1502 is instructed to adjust the parallax between two images. In this case, changing the parallax in a direction that reduces the stereoscopic effect (pop-out amount) of a 3D picture taken is preferred and, specifically, the parallax is changed to have a smaller value than the original parallax between the two images taken (the parallax detected by the parallax detecting section 1500).

Next, the monitoring of the output of the horizontal/vertical motion sensor 210 is continued and the end of panning or tilting is detected by the same method that is used in the first embodiment and the third embodiment (Steps 1603 and 1604). In the case where panning or tilting is still ongoing, the monitoring is continued. When it is determined that panning or tilting has ended, the system control section 801 proceeds to Step 1605, where the parallax changing section 1502 is instructed to adjust the parallax between the two images (to expand the parallax back to its original value).

As described above, according to the fifth embodiment, pictures appropriate for viewing are obtained in 3D picture imaging by changing the parallax between two images in a situation where a picture taken may give a viewer a sense of strangeness due to camera operation such as panning or tilting.

Figure 18:
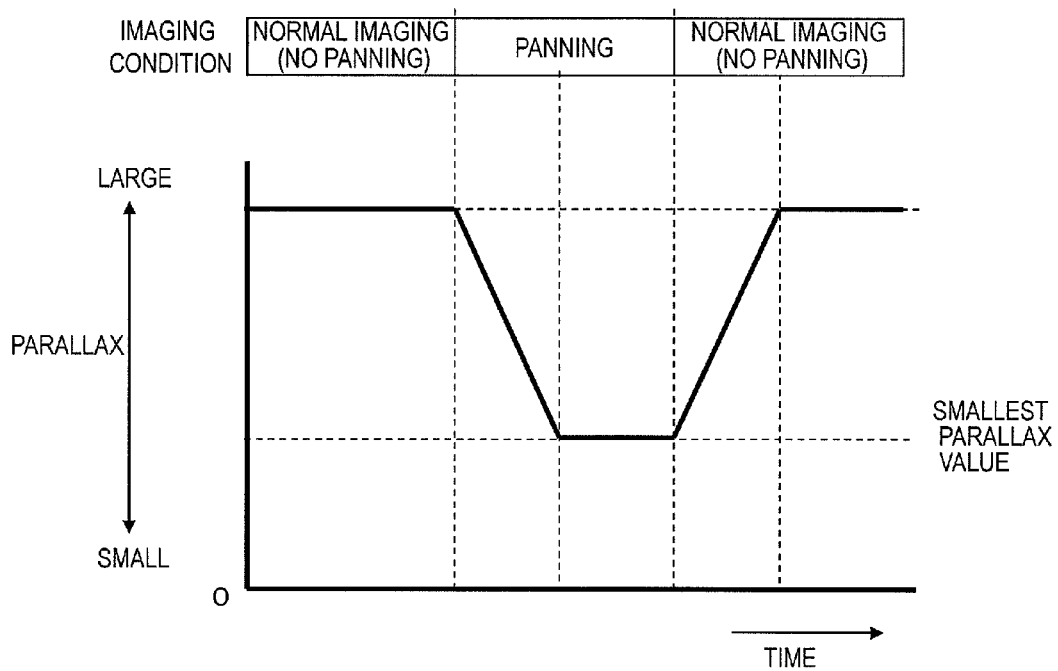
FIG. 18 is a diagram illustrating a parallax changing method according to the fifth embodiment of the present invention.

The parallax may be changed by, for example, keeping two parallax values for two states: normal imaging (no panning or tilting) and panning or tilting imaging, and switching between the two values. However, a steep change in parallax rapidly changes the stereoscopic effect of a 3D picture taken and is therefore undesirable. Desirably, the parallax is changed gradually after panning or tilting is detected and is also returned gradually to its original value after panning or tilting is ended, as illustrated in FIG. 18. FIG. 18 is a diagram illustrating a method of changing the parallax. In FIG. 18, the axis of ordinate represents the magnitude of parallax and the axis of abscissa represents time (in seconds). By gradually changing the parallax after panning or tilting is detected and also gradually returning the parallax back to its original value after panning or tilting is ended, the sense of strangeness felt by a viewer is lessened even more.

When an image is read out of the buffer memory 1501, if the image cut-out point is changed by shifting the reading point in the horizontal direction, there is a fear that a part of the image is lost in the process of cutting out. To avoid this, two images recorded in the buffer memory 1501 are given surplus pixels as a margin in the horizontal direction in advance.

The fifth embodiment describes a structure in which a parallax is adjusted by detecting panning or tilting. Alternatively, a parallax may be adjusted in accordance with the magnitude of camera shake during imaging as in the second embodiment and the fourth embodiment. In this case, the parallax is set smaller when the magnitude of camera shake is larger. The parallax adjusting section 1400 reduces the parallax and reduces the stereoscopic effect of a 3D picture taken when it is determined that the shaking of the image pickup apparatus is equal to or larger than a given level. If it is subsequently determined that the shaking of the image pickup apparatus has decreased from the given level or more to less than the given level, the parallax adjusting section 1400 increases the parallax and enhances the stereoscopic effect of a 3D picture taken (in other words, brings the stereoscopic effect back to its original level).

Figure 19:
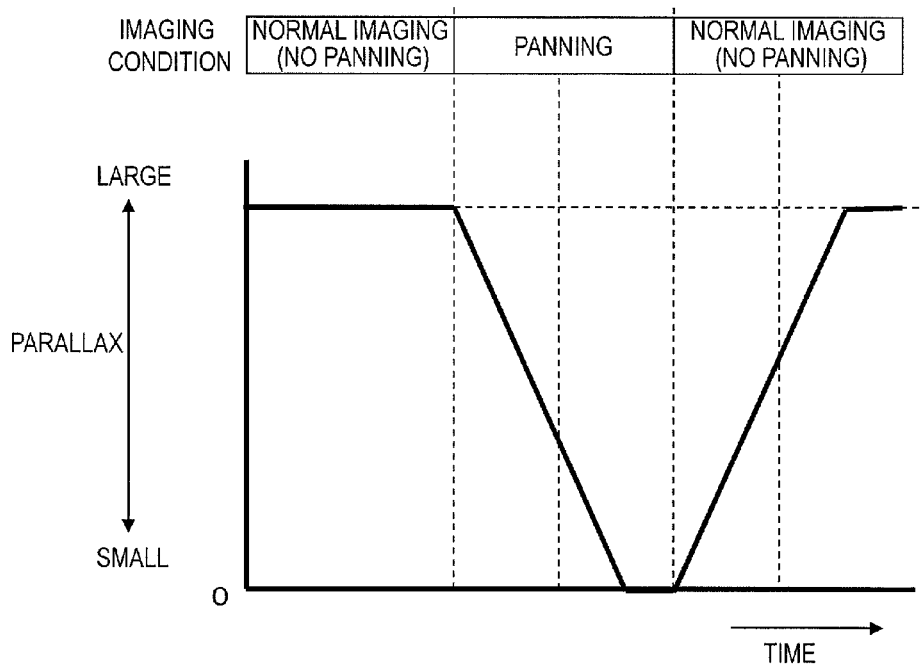
FIG. 19 is a diagram illustrating another parallax changing method according to the fifth embodiment of the present invention.

The fifth embodiment describes a structure in which the parallax is reduced in panning or tilting. However, because setting the parallax to zero equals taking 2D pictures, the parallax may be reduced to zero during panning or tilting to ultimately record 2D videos during panning or tilting as illustrated in FIG. 19. In this case, only predetermined one of two images (the left image and the right image) may be recorded while the parallax is zero.

In the first to fifth embodiments of the present invention, detecting the shaking of the image pickup apparatus due to panning or tilting or due to camera shake requires a certain time. This means that the recording of 3D pictures continues for the certain period of time since the start of panning or tilting or the start of camera shake, and pictures that give a viewer a sense of strangeness are taken in that period. This can be avoided by, for example, securing a capacity in the memory 204 or the buffer memory 1501 that is large enough to accumulate left images and right images for a length of time equal to the certain period of time and, if panning, tilting, or camera shake is detected, going back the certain period of time required for the detection to take the measures described above (for example, changing the output from 3D pictures to 2D pictures or adjusting the parallax between two images (the left image and the right image)), and then supplying pictures to a display section or a recording section. Alternatively, the detection of the shaking of the image pickup apparatus due to panning or tilting or due to camera shake may be executed constantly after the image pickup apparatus is powered on, irrespective of the start of video recording. In the case where the detection of the shaking of the image pickup apparatus due to panning or tilting or due to camera shake is associated with the timing of starting video recording, more appropriate picture data is obtained by taking the measures described above (for example, changing the output from 3D pictures to 2D pictures or adjusting the parallax between two images (the left image and the right image)) at the same time video recording is started.

The first, second, and fifth embodiments of the present invention describe processing of recording a picture that is obtained from one of the two camera systems to record 2D pictures. Which one of the camera systems is to supply images that are to be recorded may be selected by the person taking the image.

The first to fifth embodiments of the present invention describe a structure that uses a gyro sensor (angular velocity sensor) to detect panning, tilting, or the shaking of the image pickup apparatus. However, the present invention is not limited thereto and may use other sensors such as an acceleration sensor and an inclination (tilt) sensor. The motion detecting section may detect panning, tilting, or the shaking of the image pickup apparatus by using a motion vector that is detected from images taken, instead of using a physical sensor such as the already described gyro sensor. The effects of the present invention described above are obtained also when the magnitude of camera shake is determined from the travel angle of the image pickup apparatus based on the motion vector, or from the calculation of the mean square value of motion vectors within a given period. The detection of a motion vector from images may use a method that detects the misalignment of images between two consecutive fields (or two consecutive frames) through pattern matching (for example, Japanese Patent No. 2516580), and is not limited to a specific method.

The first to fifth embodiments of the present invention describe the structure of an image pickup apparatus for obtaining a 3D picture that includes two camera systems. However, the present invention is not limited thereto and is also applicable to a structure that includes three or more camera systems. Similarly, the present invention is applicable to a case where a 3D picture taking system is built from a plurality of individual cameras.

The image pickup apparatus of the first to fifth embodiments of the present invention each include two image pickup devices. However, the present invention is also applicable to an image pickup apparatus that includes only one image pickup device and uses the single image pickup device to generate 3D picture data.

As described above, the operation of switching between 2D picture data and 3D picture data depending on the motion of the image pickup apparatus, the operation of changing the stereo base of the optical systems in accordance with the motion of the image pickup apparatus, and the operation of adjusting the parallax between the left image and the right image in accordance with the motion of the image pickup apparatus may be implemented by hardware or by software. A program for causing the image pickup apparatus to execute those operations is stored in, for example, a built-in memory of the system control section, the 3D picture generating section, the parallax adjusting section, or the like. The program may also be stored in a recording medium that is provided separately from those components.

3D pictures described in the first to fifth embodiments of the present invention are time division-type 3D pictures. However, the present invention is not limited thereto and is also applicable to other commonly known 3D picture types.

The first to fifth embodiments of the present invention do not give a particular description on audio recording, but it should be understood that audio may be recorded in synchronization with video recording.

When switching from 3D imaging to 2D imaging is made in the first to fifth embodiments of the present invention, the person taking the image may be notified of the fact that 3D pictures cannot be taken by displaying a message to that effect on a display section, or by alerting the person taking the image via a dedicated indicator or similar measures. This allows the person taking the image to recognize that 3D pictures cannot be taken under the current conditions and to try to operate the camera in a manner appropriate for 3D imaging. Pictures that are even more appropriate for viewing can thus be taken.

The present invention is a system capable of taking appropriate 3D pictures through automatic camera control or the processing of a picture taken in 3D picture imaging even under conditions where the picture taken may give a viewer a sense of strangeness, and is advantageous particularly in the technical field of 3D picture.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image pickup apparatus, comprising:
a motion detecting section which detects a motion of the image pickup apparatus; and
a picture data outputting section which switches its output between 2D picture data and 3D picture data obtained by picking up subject images, depending on the detected motion of the image pickup apparatus.

2. An image pickup apparatus according to claim 1, further comprising a determining section which determines whether or not the image pickup apparatus is performing at least one of panning imaging and tilting imaging based on the detected motion of the image pickup apparatus,
wherein, when it is determined that the image pickup apparatus is performing the at least one of the panning imaging and the tilting imaging while the picture data outputting section is outputting the 3D picture data, the picture data outputting section switches its output from the 3D picture data to the 2D picture data.

3. An image pickup apparatus according to claim 2, wherein, when it is determined that the image pickup apparatus has shifted from performing the at least one of the panning imaging and the tilting imaging to performing none of the panning imaging and the tilting imaging, the picture data outputting section switches its output from the 2D picture data to the 3D picture data.

4. An image pickup apparatus according to claim 1, further comprising a determining section which determines a state of shaking of the image pickup apparatus due to camera shake based on the detected motion of the image pickup apparatus,
wherein, when it is determined that the shaking of the image pickup apparatus is equal to or larger than a given level while the picture data outputting section is outputting the 3D picture data, the picture data outputting section switches its output from the 3D picture data to the 2D picture data.

5. An image pickup apparatus according to claim 4, wherein, when it is determined that the shaking of the image pickup apparatus has shifted from the given level or more to less than the given level, the picture data outputting section switches its output from the 2D picture data to the 3D picture data.

6. An image pickup apparatus according to claim 1, wherein the motion detecting section comprises an angular velocity sensor.

7. An image pickup apparatus according to claim 1, wherein the motion detecting section detects a motion vector from an image taken.

8. An image pickup apparatus, comprising:
a motion detecting section which detects a motion of the image pickup apparatus;
a first optical system and a second optical system which are disposed side by side and each form a subject image;
a picture data generating section which generates 3D picture data based on image signals that are obtained by picking up two subject images formed by the first optical system and the second optical system; and
a changing section which moves at least one of the first optical system and the second optical system in a direction perpendicular to an optical axis in accordance with the detected motion of the image pickup apparatus, to thereby change a stereo base which is a distance between optical axes of the first optical system and the second optical system and change a parallax between an image for a right eye and an image for a left eye.

9. An image pickup apparatus according to claim 8, further comprising a determining section which determines whether or not the image pickup apparatus is performing at least one of panning imaging and tilting imaging based on the detected motion of the image pickup apparatus,
wherein, when it is determined that the image pickup apparatus is performing the at least one of the panning imaging and the tilting imaging, the changing section shortens the stereo base.

10. An image pickup apparatus according to claim 9, wherein, when it is determined that the image pickup apparatus has shifted from performing the at least one of the panning imaging and the tilting imaging to performing none of the panning imaging and the tilting imaging, the changing section lengthens the stereo base.

11. An image pickup apparatus according to claim 8, further comprising a determining section which determines a state of shaking of the image pickup apparatus due to camera shake based on the detected motion of the image pickup apparatus,
wherein, when it is determined that the shaking of the image pickup apparatus is equal to or larger than a given level, the changing section shortens the stereo base.

12. An image pickup apparatus according to claim 11, wherein, when it is determined that the shaking of the image pickup apparatus has shifted from the given level or more to less than the given level, the changing section lengthens the stereo base.

13. An image pickup apparatus according to claim 8, wherein the motion detecting section comprises an angular velocity sensor.

14. An image pickup apparatus according to claim 8, wherein the motion detecting section detects a motion vector from an image taken.

15. An image pickup apparatus, comprising:
a motion detecting section which detects a motion of the image pickup apparatus;
a parallax adjusting section which changes a parallax between an image for a right eye and an image for a left eye obtained by picking up subject images by the image pickup apparatus in accordance with the detected motion of the image pickup apparatus; and
a picture data generating section which generates 3D picture data based on the changed parallax.

16. An image pickup apparatus according to claim 15, further comprising a determining section which determines whether or not the image pickup apparatus is performing at least one of panning imaging and tilting imaging based on the detected motion of the image pickup apparatus,
wherein, when it is determined that the image pickup apparatus is performing the at least one of the panning imaging and the tilting imaging, the parallax adjusting section reduces the parallax.

17. An image pickup apparatus according to claim 16, wherein, when it is determined that the image pickup apparatus has shifted from performing the at least one of the panning imaging and the tilting imaging to performing none of the panning imaging and the tilting imaging, the parallax adjusting section increases the parallax.

18. An image pickup apparatus according to claim 15, further comprising a determining section which determines a state of shaking of the image pickup apparatus due to camera shake based on the detected motion of the image pickup apparatus,
wherein, when it is determined that the shaking of the image pickup apparatus is equal to or larger than a given level, the parallax adjusting section reduces the parallax.

19. An image pickup apparatus according to claim 18, wherein, when it is determined that the shaking of the image pickup apparatus has shifted from the given level or more to less than the given level, the parallax adjusting section increases the parallax.

20. An image pickup apparatus according to claim 15, wherein the motion detecting section comprises an angular velocity sensor.

21. An image pickup apparatus according to claim 15, wherein the motion detecting section detects a motion vector from an image taken.

22. A non-transitory computer-readable medium storing a computer program for causing an image pickup apparatus to execute picture processing, the program further causing the image pickup apparatus to execute the step of switching its output between 2D picture data and 3D picture data obtained by picking up subject images, depending on a motion of the image pickup apparatus.

23. A non-transitory computer-readable medium storing a computer program for causing an image pickup apparatus to execute picture processing, the program further causing the image pickup apparatus to execute the steps of:
    changing a parallax between an image for a right eye and an image for a left eye obtained by picking up subject images by the image pickup apparatus in accordance with a motion of the image pickup apparatus; and
    generating 3D picture data based on the changed parallax.

* * * * *